(12) United States Patent
Harter et al.

(10) Patent No.: US 9,466,159 B1
(45) Date of Patent: Oct. 11, 2016

(54) METHODS AND SYSTEMS FOR AUTOMATICALLY IDENTIFYING A DATA SOURCE FOR AN ON-BOARD RECORDER

(71) Applicant: J. J. Keller & Associates, Inc., Neenah, WI (US)

(72) Inventors: Thomas C. Harter, Neenah, WI (US); Michael K. Kuphal, Greenville, WI (US); Bruce D. Lightner, La Jolla, CA (US); Randel J. Thome, Oshkosh, WI (US)

(73) Assignee: J. J. Keller & Associates, Inc., Neenah, WI (US)

( * ) Notice: Subject to any disclaimer, the term of this patent is extended or adjusted under 35 U.S.C. 154(b) by 27 days.

(21) Appl. No.: 14/683,522

(22) Filed: Apr. 10, 2015

(51) Int. Cl.
| | | |
|---|---|---|
| G01M 17/00 | (2006.01) | |
| G06F 7/00 | (2006.01) | |
| G06F 19/00 | (2011.01) | |
| G07C 5/08 | (2006.01) | |
| H04L 29/08 | (2006.01) | |
| G07C 5/02 | (2006.01) | |

(52) U.S. Cl.
CPC .............. *G07C 5/085* (2013.01); *G07C 5/02* (2013.01); *H04L 67/12* (2013.01)

(58) Field of Classification Search
CPC .......... G07C 5/085; G07C 5/02; H04L 67/12
See application file for complete search history.

(56) References Cited

U.S. PATENT DOCUMENTS

| 5,485,607 | A | 1/1996 | Lomet et al. |
| 6,418,438 | B1 | 7/2002 | Campbell |
| 8,151,567 | B2 | 4/2012 | Rollinger et al. |
| 8,452,522 | B2 | 5/2013 | Gao et al. |
| 2009/0076630 | A1* | 3/2009 | Okamoto .............. G06F 8/60 700/7 |
| 2011/0066319 | A1* | 3/2011 | Bechtler ................ B60T 8/885 701/29.2 |
| 2013/0158838 | A1 | 6/2013 | Yorke et al. |
| 2014/0052342 | A1 | 2/2014 | Seibert |
| 2014/0229087 | A1 | 8/2014 | Keates et al. |
| 2014/0279707 | A1 | 9/2014 | Joshua et al. |
| 2014/0292544 | A1* | 10/2014 | Borland ................ G08G 1/207 340/988 |

(Continued)

FOREIGN PATENT DOCUMENTS

| EP | 1566744 | 8/2005 |
| EP | 1978457 | 8/2009 |

OTHER PUBLICATIONS

Michele Ruta et al., "A Mobile Knowledge-based System for On-Board Diagnostics and Car Driving Assistance", IARIA, 2010, 91-96.

*Primary Examiner* — Tuan C. To
(74) *Attorney, Agent, or Firm* — Michael Best & Friedrich LLP

(57) ABSTRACT

Apparatuses, methods, and systems installed in a vehicle. One method includes identifying, with a processing unit installed in a vehicle, one of a plurality of data sources providing vehicle data over a communication interface in the vehicle, wherein the plurality of data sources provide vehicle data from at least two different vehicle control modules. The method also includes incrementing, with the processing unit, a counter associated with the one of the plurality of data sources, comparing, with the processing unit, the counter to a threshold, setting, with the processing unit, the one of the plurality of data sources as an active data source for receiving vehicle data when the counter exceeds the threshold, and processing the vehicle data received provided by the one of the plurality of data sources.

18 Claims, 15 Drawing Sheets

(56) References Cited

U.S. PATENT DOCUMENTS

| | | | |
|---|---|---|---|
| 2015/0089489 A1* | 3/2015 | Sarkar | G06F 8/67 717/173 |
| 2016/0134501 A1* | 5/2016 | Timms | H04L 69/22 370/252 |
| 2016/0138492 A1* | 5/2016 | Levy | F02D 29/02 701/102 |

* cited by examiner

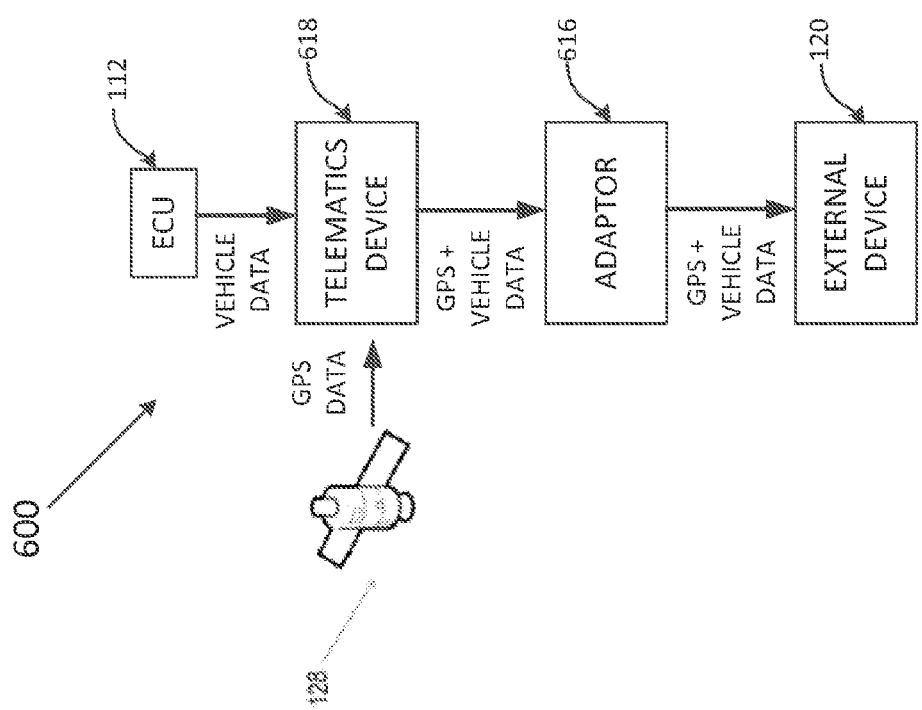

METHODS AND SYSTEMS FOR AUTOMATICALLY IDENTIFYING A DATA SOURCE FOR AN ON-BOARD RECORDER

BACKGROUND

Embodiments of the present invention relate to methods and systems for monitoring and managing vehicle drivers. More particularly, embodiments of the invention relate to systems and methods for logging and managing data for complying with requirements governing the operation of commercial motor vehicles.

SUMMARY

Operators of commercial motor vehicles ("CMVs") are required to comply with certain regulations, including hours-of-service requirements. For example, the U.S. Department of Transportation Federal Motor Carrier Safety Administration ("FMCSA") has established a comprehensive list of regulations that professional operators of CMVs must comply with. These regulations govern operators, CMVs, and the trucking companies (sometimes called "carriers") owning the carriers. Professional operators must comply with the obligations imposed under federal and state requirements, and these requirements include not only physical and age requirements but also define ways an operator can lose his or her commercial driving privileges. Trucking companies and companies having trucking operations that support their core business are typically required to evaluate and track many aspects of CMV operators and their abilities to perform job tasks such as operator qualifications (for example, operator licensing and renewal); alcohol and drug testing; accident reporting; operator training; and hiring and screening of applicants.

Some CMVs are equipped with an electronic-on-board-recorder to record data relating to the vehicle. In some embodiments, the recorder can be configured to receive data from a vehicle data bus. A mobile communication device (e.g., a smart phone, tablet computer, or laptop computer equipped with a radio transceiver) can then be connected to the vehicle-installed recorder, and the recorder provides data that has been read or received from the vehicle to the mobile communication device. The mobile communication device processes the data and transmits the processed data to a remote device, such as a server (e.g., via a cellular connection). In some embodiments, the mobile communication device processes the data by formatting the data. In other embodiments, the mobile communication device processes the data for functional purposes, such as compiling the data and/or comparing the data to driver regulations to determine driver compliance with the regulations. In yet other embodiments, the remote device receiving the data from the mobile communication device performs this processing.

In one embodiment, the invention provides an apparatus for obtaining data regarding a vehicle. The apparatus includes a connector for physically coupling the apparatus to a telematics device installed in a vehicle, a communication module configured to receive vehicle data and location data from the telematics device, a transceiver, and a processing unit. The processing unit is configured to receive the vehicle data and the location data from the telematics device through the communication module, and transmit at least a portion of the vehicle data and at least a portion of the location data to an external device using the transceiver.

In another embodiment, the invention provides a method of obtaining data regarding a vehicle. The method includes receiving, with an adaptor, vehicle data and location data from a telematics device installed in the vehicle, wherein the adaptor is physically coupled to the telematics device using a serial connection. The method also includes transmitting, over a wireless connection, at least a portion of the vehicle data and at least a portion of the location data to an external device.

In a further embodiment, the invention provides a method for transmitting location data from a collection device installed in a vehicle to an external device. The method includes receiving, with the collection device, a plurality of instances of location data for the vehicle, wherein each of the plurality of instances of the location data includes a coordinate, a time, and a quality value and storing, in a memory module of the collection device, the plurality of instances of location data. The method also includes receiving, with the collection device, a request from the external device, the request associated with a time period, determining, with the collection device, a set of location data from the plurality of instances of location data based on the time period, and transmitting the set of location data to the external device.

In yet another embodiment, the invention provides a system for logging location data. The system includes a collection device installed in a vehicle. The collection device includes a processing unit, a memory module, and a transceiver. The processing unit is configured to receive a plurality of instances of location data for the vehicle, wherein each of the plurality of instances of the location data includes a coordinate, a time, and a quality value, and store the plurality of instances of location data in the memory module. The processing unit is also configured to receive a request from the external device, the request associated with a time period, determine a set of location data from the plurality of instances location data based on the time period, and transmit the set of location data to the external device.

In still a further embodiment, the invention provides an apparatus installed in a vehicle. The apparatus includes a processing unit. The processing unit is configured to selectively receive vehicle data from a plurality of data sources communicating with at least one communication interface included in the vehicle, determine whether a data source is set as an active data source, and, when a data source is set as the active data source, process vehicle data from the active data source when vehicle data is available from the active data source. When no data source is set as the active data source, the processing unit is configured to identify a preferred data source of the plurality of data sources based on predefined criteria, increment a counter associated with the preferred data source, compare the counter to a threshold, set the preferred data source as the active data source when the counter exceeds the threshold, and process the vehicle data received from the preferred data source.

In still another embodiment, the invention provides a vehicle communication system. The vehicle communication system includes a communication interface configured to communicate with a plurality of data sources, a memory module configured to store a counter associated with each of the plurality of data sources, and a processing unit. The processing unit is configured to receive vehicle data from at least one of the plurality of data sources, determine whether one of the plurality of data sources is set as an active data source, and, when one of the plurality of data sources is set as an active data source, process vehicle data from the active data source when vehicle data is available from the active data source. When none of the plurality of data sources are set as the active data source and the at least one of the plurality of data sources includes a single data source, the processing unit is configured to increment the counter associated with the single data source, compare the counter to a threshold, set the single data source as the active data source when the counter exceeds the threshold, and process the vehicle data received from the single data source.

In another embodiment, the invention provides a method of obtaining vehicle data. The method includes identifying, with a processing unit installed in a vehicle, one of a plurality of data sources providing vehicle data over a communication interface in the vehicle, wherein the plurality of data sources provide vehicle data from at least two different vehicle control modules. The method also includes incrementing, with the processing unit, a counter associated with the one of the plurality of data sources, comparing, with the processing unit, the counter to a threshold, setting, with the processing unit, the one of the plurality of data sources as an active data source for receiving vehicle data when the counter exceeds the threshold, and processing the vehicle data received provided by the one of the plurality of data sources.

In yet another embodiment, the invention provides a method for transmitting vehicle data from a collection device installed in a vehicle to an external device. The method includes receiving, with the collection device, a plurality of instances of vehicle data for the vehicle, detecting, with the collection device, a plurality of drive events based on the plurality of instances of vehicle data, and storing, in a memory module of the collection device, the plurality of drive events. The method also includes receiving, with the collection device, a request from the external device, the request associated with a time period, determining, with the collection device, a set of drive events from the plurality of drive events based on the time period, and transmitting the set of drive events to the external device.

In still a further embodiment, the invention provides a system for logging vehicle data. The system includes a collection device installed in a vehicle. The collection device including a processing unit, a memory module, and a transceiver. The processing unit is configured to receive a plurality of instances of vehicle data, detect a plurality of drive events based on the plurality of instances of vehicle data, and store the plurality of drive events in the memory module. The processing unit is also configured to receive a request from the external device, the request associated with a time period, determine a set of drive events from the plurality of drive events based on the time period, and transmit the set of drive events to the external device.

Other aspects of the invention will become apparent by consideration of the detailed description and accompanying drawings.

BRIEF DESCRIPTION OF THE DRAWINGS

FIG. 8b illustrates data transmission using the driver performance monitoring system of FIG. 6.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

For example, it should be understood that the steps of the methods described herein can be executed simultaneously, in parallel, or in an order that differs from the described manner of execution. The methods are also capable of being executed using fewer or more steps than as described in the present application.

Figure 1:
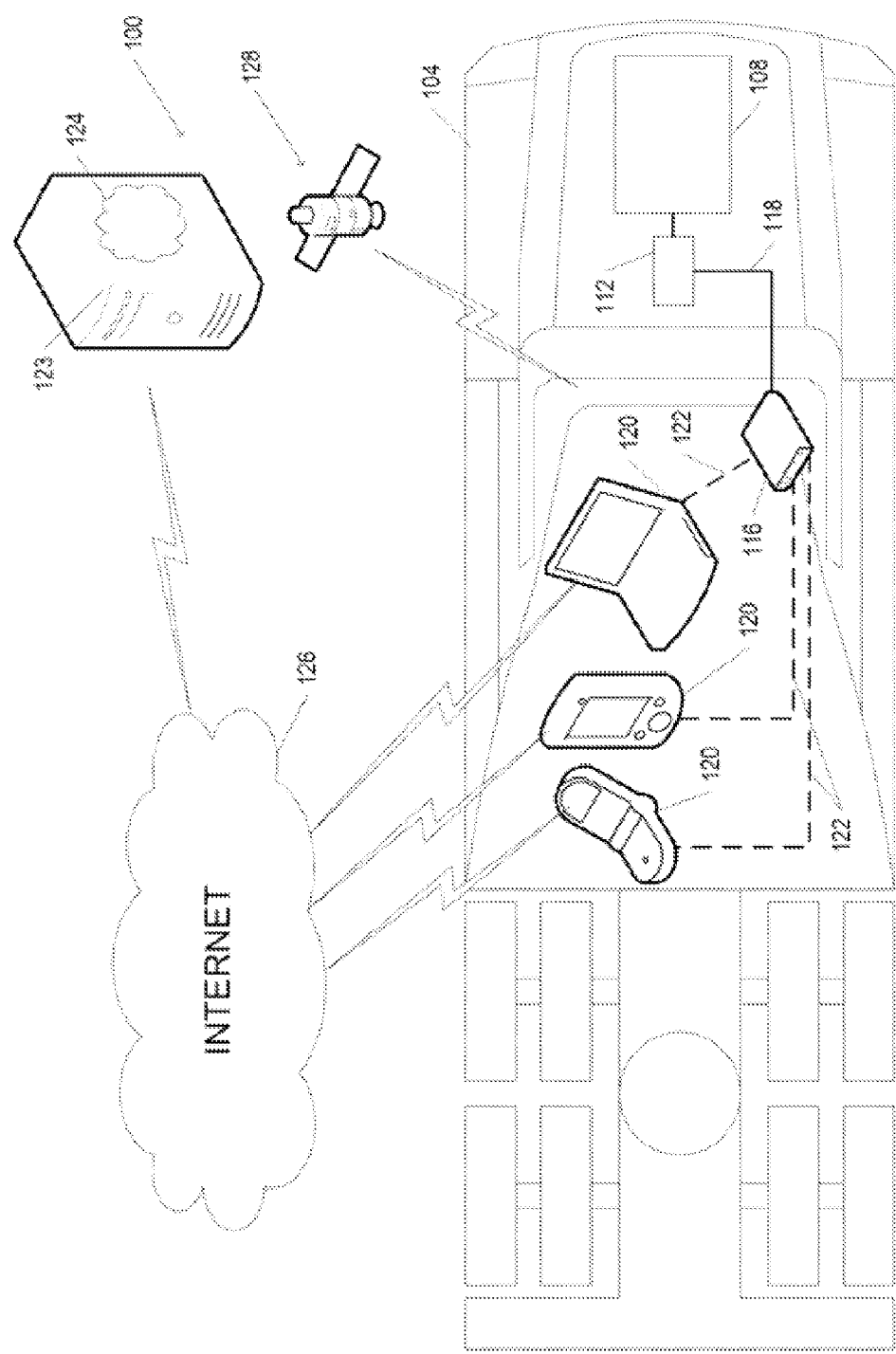
FIG. 1 schematically illustrates a driver performance monitoring system according to one embodiment of the invention.

FIG. 1 illustrates a performance monitoring system 100 for use with a vehicle 104. Although the vehicle 104 is illustrated as a commercial vehicle in the form of a tractor configured to tow a trailer (not shown), the performance monitoring system 100 can also be implemented in other types of vehicles, such as construction vehicles, agricultural equipment, and passenger vehicles. The vehicle 104 includes an engine 108 that drives the vehicle 104. The engine 108 is controlled by an electronic control unit ("ECU") 112. The ECU 112 monitors operating parameters of the vehicle 104 and controls the engine 108 and other parts of the vehicle 104 based on the monitored parameters. Operating parameters monitored by the ECU 112 include speed, hours of vehicle or engine operation, operating status, ignition state, trip distance, total vehicle distance, and the like.

In one embodiment, the performance monitoring system 100 includes an electronic on-board recorder ("EOBR") base unit 116, one or more external devices 120 (i.e., external to the base unit 116), and a remote server 123 running a remote host application 124. As illustrated in FIG. 1, the base unit 116 communicates with the ECU 112 through a data bus 118. The data bus 118 can conform to communication standards such as SAE J1939, SAE J1708, or other standards. The base unit 116 also communicates with the external devices 120 through a wired or wireless link 122. For example, in some embodiments, the base unit 116 communicates with the external devices 120 using short-wave radio transmissions in the ISM band from 2400 to 2485 MHz (commonly referred to as Bluetooth or the IEEE 802.15.1 standard).

In some embodiments, an external device 120 is a mobile communication device, such as smart phone, a tablet computer, a laptop computer, a smart watch, or another computing device upon which software can be readily installed, that can wirelessly connect to other devices, and that can be carried and moved by a user. As illustrated in FIG. 1, when the external device 120 includes a mobile communication device, the external device 120 wirelessly communicates with the remote server 123 over a communication network 126, such as a cellular network connection or the Internet (e.g., using a Wi-Fi connection).

The base unit 116 performs a plurality of functions including, for example, time keeping and data logging. In one implementation, the base unit 116 records and stores vehicle data (e.g., data for complying with Federal Motor Carrier Safety Administration ("FMCSA") regulations), such as vehicle operating parameters monitored by the ECU 112.

The base unit 116 is powered via a connection to a battery (e.g., a 12 volt or 24 volt vehicle battery). In some embodiments, the base unit 116 is configured to operate in a fully operational mode and a sleep mode to conserve power. When the base unit 116 is in the fully operational mode, the base unit 116 obtains vehicle data from the ECU 112. For example, data may be obtained by the base unit from the ECU 112 substantially in real-time or at a predefined frequency or interval. If the base unit 116 is coupled with an external device 120 (e.g., a mobile communication device), the base unit 116 can send data regarding the vehicle 104 to the device 120.

Figure 2:
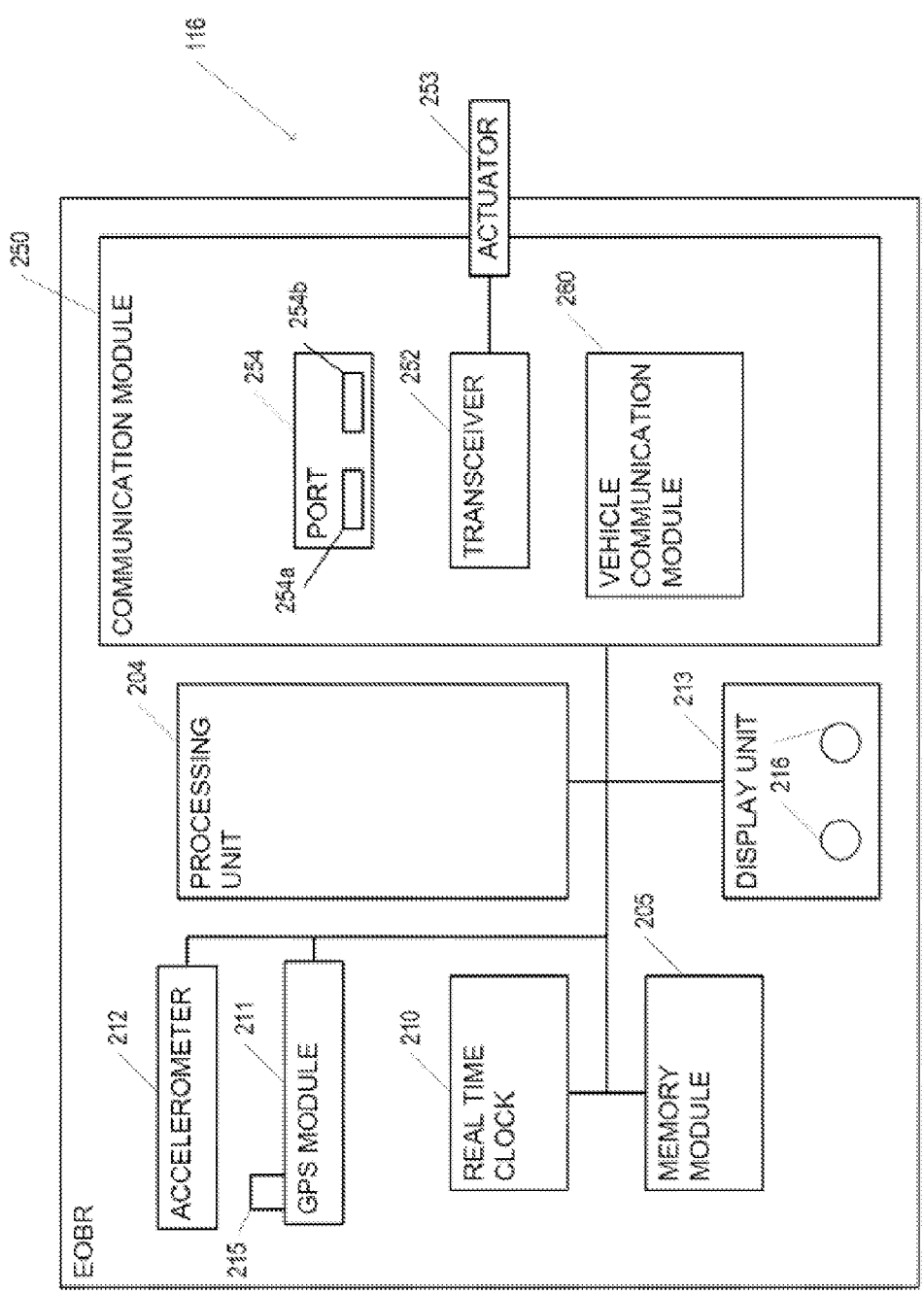
FIG. 2 schematically illustrates a base unit included in the system of FIG. 1.

As shown in FIG. 2, the base unit 116 includes a processing unit 204 (such as a microprocessor, controller, or application-specific-integrated circuit ("ASIC")) and at least one memory module 205. The memory module 205 includes non-transitory computer readable medium, such as a non-volatile serial flash memory and volatile memory. As described in more detail below, the memory module 205 stores instructions that, when executed by the processing unit 204, logs vehicle data, logs data retrieval history, and processes data received from the ECU 112 and other devices and systems external to the base unit 116. Accordingly, as described herein, the base unit 116 performs particular functionality by executing instructions with the processing unit 204.

The base unit 116 also includes a real-time clock 210, a global positioning system ("GPS") module 211, an accelerometer 212, and a display unit 213. The real-time clock 210 provides a real-time clock function to allow the base unit 116 to accurately determine a time with a predetermined resolution (e.g., approximately one second). The real-time clock 210 is powered by a battery that provides power to the clock 210 even when the vehicle 104 does not provide power to the base unit 116. In some embodiments, the real-time clock 210 is configured to obtain an updated time from the GPS module 211.

The GPS module 211 includes a GPS antenna 215, which can be internal to the base unit 116. Positioning the antenna 215 internal to the base unit 116 makes the antenna 215 more tamper-proof than if the antenna 215 were positioned external to the base unit 116. Based on data received by the GPS antenna 215 from one or more external satellites 128 (see FIG. 1), the GPS module 211 provides location data to the processing unit 204. The location data can include GPS coordinates (e.g., latitude and longitude coordinates), a speed, a heading, a time, and a quality value. In some embodiments, the GPS module 211 updates the location data at a predetermined frequency (e.g., approximately once per second). The GPS module 211 remains active when the vehicle 104 is in motion and whenever the vehicle ignition is "on." When the base unit 116 is in sleep mode, the GPS module 211 is activated periodically after a predetermined period of time to ensure that the vehicle ignition is not "on" (e.g., the vehicle 104 is not moving).

The display unit 213 communicates data to a user of the base unit 116. For example, the display unit 213 can include one or more LEDs 216. The LEDs 216 indicate a status of the base unit 116. For example, the LEDs 216 can be used to indicate whether an external device 120 connected to the base unit 116 is properly functioning (e.g., a connection status), whether signals are being communicated between the base unit 116 and the ECU 112 (e.g., a communication status), and whether signals are being communicated between the base unit 116 and an external device 120 (e.g., a mobile communication device communication status). The LEDs 216 can include different colored LEDs and can be configured to flash at different frequencies to signal different statuses of the base unit 116. As an alternative to or in addition to the LEDs 216, the display unit 214 can be configured to provide data to a user through other output mechanisms, such as displaying a textual and/or graphical message, playing an audio sound or message, providing tactile feedback (e.g., vibration), or a combination thereof.

The base unit 116 also includes a communication module 250. As illustrated in FIG. 2, the communication module 250 includes a transceiver 252 for communicating data between the base unit 116 and an external device 120. The transceiver 252 can communicate with an external device 120 using a wired or wireless connection. For example, as described above, in some embodiments, the base unit 116 communicates with an external device 120 using a Bluetooth connection. Accordingly, the transceiver 252 can include a Bluetooth transceiver. In some embodiments, the transceiver 252 operates simultaneously with the GPS module 211.

A Bluetooth-enabled device can be configured to automatically search and discover other Bluetooth-enabled devices. The base unit 116 can include a connection actuator 253 that allows a user to control when the base unit 116 becomes discoverable or searchable. For example, in some embodiments, pressing the connection actuator 253 for a predetermined period of time (e.g., three seconds) makes the base unit 116 discoverable or searchable by a Bluetooth-enabled external device 120. Also, if the base unit 116 is operating in a sleep mode, pressing the connection actuator 253 wakes up the processing unit 204 and enables communication between the base unit 116 and the external device 120. In some embodiments, the base unit 116 is also configured to automatically become discoverable or searchable for a predefined period of time after the base unit 116 is powered or reset and for a predefined period of time after the base unit 116 enters a sleep mode.

When the base unit 116 is discoverable, an external device 120 can search for, discover, and couple to the base unit 116. In some embodiments, the base unit 116 couples to the external device 120 as a slave unit. Once the base unit 116 and the external device 120 are properly coupled, the base unit 116 is no longer discoverable or searchable. Once the external device 120 is coupled to the base unit, the display unit 213 of the base unit 116 can indicate a status of the connection or coupling. For example, when the base unit 116 is discoverable or searchable, one or more of the LEDs 216 can flash, and, when the base unit 116 is coupled to the external device 120, the one or more LEDs 216 can provide a solid light. After the external device 120 and the base unit 116 are coupled, the device 120 and the unit 116 can exchange data. For example, as described above, the base unit 116 can transmit vehicle data to the external device 120. It should be understood that even when the transceiver 264 is transmitting vehicle data to the external device 120, the base unit 116 continues to monitor and record new vehicle data from the ECU 112 and other devices and systems (e.g., the GPS module 211, the accelerometer 212, etc.).

As illustrated in FIG. 2, the communication module 250 also includes a port 254 for physically coupling the external device 120 to the base unit 116. The port 254 allows diagnostic data to be transmitted between the external device 120 and the base unit 116. In some embodiments, the port 254 includes one or more universal serial port ("USB") connections. For example, the port 254 can include a first USB connection 254a and a second USB connection 254b. The first connection 254a is used to transmit diagnostic data regarding the base unit 116 to the external device 120 but does not provide a charging current to the external device 120. Therefore, the second connection 254b is used to provide a charging current to the external device 120. By proving two separate connections, one for charging and one for data transmission, the base unit 116 does not need to include an isolated DC power supply.

The diagnostic data transmitted through the port 254 can relate to the base unit 116 (as compared to the ECU 112 or other components of the vehicle 104). Therefore, a user can couple an external device 120 to the port 254 to diagnose a malfunction occurring with the base unit 116. Similarly, the port 254 can allow the base unit 116 to be reconfigured, modified, or upgraded using an external device 120.

Figure 3:
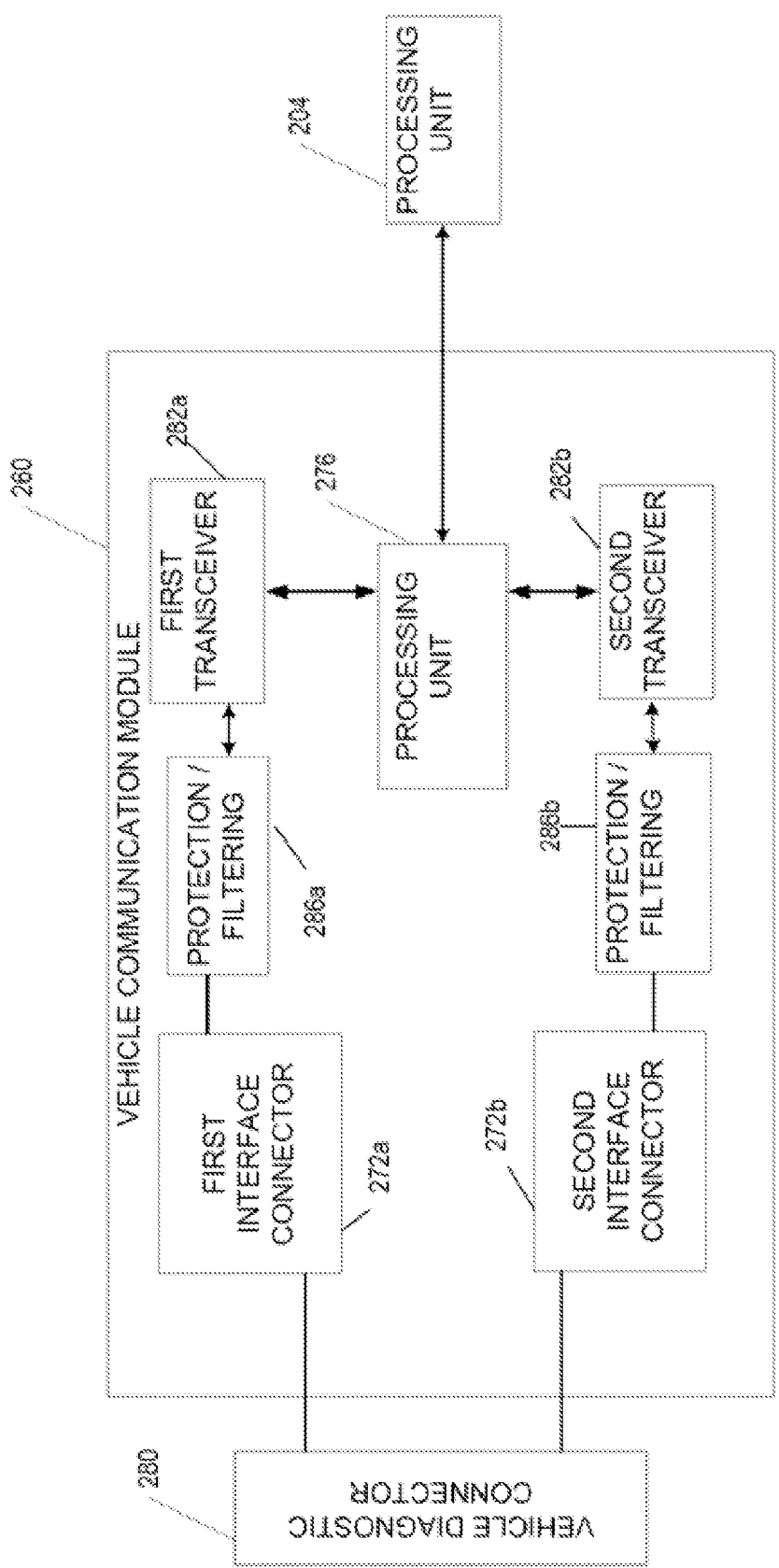
FIG. 3 schematically illustrates a vehicle communication module included in the base unit of FIG. 2.

The communication module 250 also includes a vehicle communication module 260 for communicating with the ECU 112. As illustrated in FIG. 3, the vehicle communication module 260 includes a processing unit 276 (such as a microprocessor, controller, or application-specific-integrated circuit ("ASIC")) configured to manage communication between the base unit 116 and the ECU 112. For example, the processing unit 276 decodes and buffers data transmitted between the base unit 116 and the ECU 112 and communicates with the processing unit 204. It should be understood that, in some embodiments, the functionality provided by the processing unit 276 is performed by the processing unit 204 (e.g., eliminating the need for a separate processing unit in the vehicle communication module 260).

To physically connect with the ECU 112, the base unit 116 includes a plurality of communication interfaces 272 to accommodate various types of vehicle data buses. For example, as described above, the ECU 112 communicates over a data bus 118, which can conform to communication standards such as SAE J1939, SAE J1708, or other standards. In some embodiments, diagnostic data is transmitted over the data bus 118. Therefore, the bus 118 can be considered an on-board diagnostic ("OBD") bus that includes a diagnostic connector 280 that allows external devices to connect to and exchange data with the bus 118. Different types of vehicles can include different types of connectors 280 for connecting to the bus 118. For example, a standard passenger vehicle can include a SAE J1939 interface connector, but a commercial motor vehicle can include a SAE J1708 interface connector.

To accommodate these different connectors (and the underlying different communication standards), the base unit 116 can include a first communication interface 272a for coupling the unit 116 to a first type of data bus (e.g., a SAE J1939 bus) and a second communication interface 272b for coupling the unit 116 to a second type of data bus (e.g., a SAE J1708 bus) (see FIG. 3). It should be understood that, in some embodiments, the base unit 116 includes more than two communication interfaces 272. For example, the base unit 116 can include a SJ1708 interface, a SAE J1939 interface, a SAE J1850 PWM interface, a SAE J1850 VP interface, an ISO 9141-2 interface, an OBD-II interface, a SAE J2284 interface, or a combination thereof. The plurality of communication interfaces 272 allows the base unit 116 to communicate with a variety of different vehicle data buses (e.g., using a variety of different communication standards) and makes the base unit 116 portable in that the base unit 116 can be removed from a first vehicle and used in second vehicle even if the second vehicle does not include the same type of diagnostic bus or connector as the first vehicle.

The vehicle communication module 260 also includes at least one transceiver 282 for managing communication via the communication interfaces 272. In some embodiments, the module 260 includes a transceiver 282 for each interface 272. For example, as illustrated in FIG. 3, the module 260 can include a first transceiver 282a and a second transceiver 284b. The first transceiver 282a can conform to the communication standard associated with the first communication interface 272a (e.g., SAE J1708) and can transmit and receive data through the first communication interface 272a. Similarly, the second transceiver 282b can conform to the communication standard associated with the second communication interface 272b (e.g., SAE J1939) and can transmit and receive data through the second communication interface 272b. The two transceivers 282 and 284 can be configured to obtain data from the vehicle diagnostic connector 280 individually or simultaneously. It should be understood that in other embodiments, the module 260 includes a transceiver 282 that conforms to more than one communication standard and, therefore, can communicate through more than one of the available communication interfaces 272 (e.g., without the need for separate transceivers).

The vehicle communication module 260 can also include one or more protection and filtering modules 286 that filter received data to reduce or eliminate data noise. The protection and filtering modules 286 can also be configured to ensure that received data has a predetermined amplitude range that is acceptable to the processing unit 276. Thus, amplitude surges in data can be detected and the processing unit 276 can be protected. In some embodiments, as illustrated in FIG. 3, the module 260 includes a protection and filtering module 286 for each transceiver 282 (e.g., a first protection and filtering module 286a and a second protection and filtering module 286b).

Figure 4:
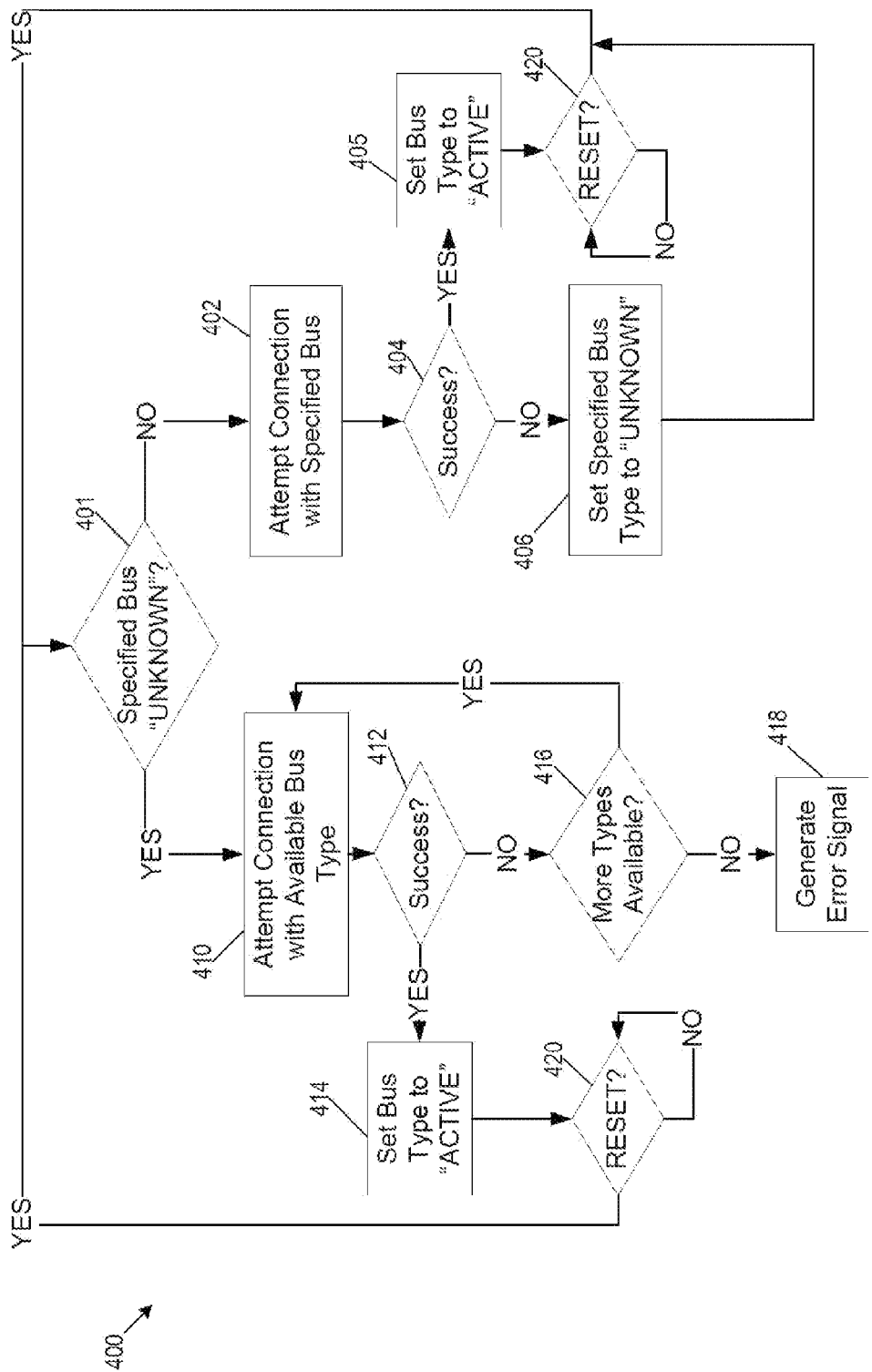
FIG. 4 is a flowchart illustrating a method implemented by the vehicle communication module of FIG. 3 to establish communication with a vehicle data bus.

The vehicle communication module 260 can be configured to execute one or more bus identification methods to automatically identify the data bus type(s) available for communicating with the ECU 112. For example, FIG. 4 illustrates one method 400 for establishing communication between the base unit 116 and the ECU 112 through the vehicle communication module 260. In this method 400, the data bus type (i.e., the particular communication interface 272) used by the vehicle communication module 260 to communicate with the ECU 112 can be manually specified by a user. For example, the user can access a drop-down menu provided by the external device 120 to select a particular bus type. If a user does not specify a bus type, the bus type can default to "UNKNOWN" or a similar default setting. Accordingly, if the user specifies a particular bus type (at block 402), the vehicle communication module 260 attempts to communicate with the ECU 112 using the specified bus type (at block 402). If the communication attempt is successful (at block 404), the module 260 uses the bus to exchange data with the ECU 112 and sets the specified bus type as the "ACTIVE" type (e.g., by saving an identifier of the specified type to an "ACTIVE" data field or variable) (at block 405). Otherwise, if the communication attempt fails (at block 404), the module 260 can issue an error signal on the display 214. Alternatively, the module 260 can be configured to reset the specified bus type to "UNKNOWN" (at block 406), which, as described below, causes the module 260 to automatically search for an available data bus.

As illustrated in FIG. 4, if a specific bus type is not defined by the user (e.g., if the bus type is defined as "UNKNOWN") (at block 401), the vehicle communication module 260 attempts to automatically determine the bus type to use for communicating with the ECU 112. In particular, the module 260 attempts to communicate with the ECU 112 using one of the standards associated with the plurality of the communication interfaces 272 (at block 410). For example, in some embodiments, the module 260 maintains a list of standards. The list of standards can be associated with an order representing preferences for testing for available interfaces 272 (e.g., test for a preferred standard first and test for a least-preferred standard last). In particular, the module 260 can be configured to initially attempt communication using the first communication interface 272a (e.g., the J1708 communication interface and associated transceiver) and, if that communication fails, the module 260 attempts communication using the next interface as specified in the ordered list. In other embodiments, the module 260 can be configured to initially attempt communication using the last bus type recorded as "ACTIVE" (see block 405 above).

In particular, as illustrated in FIG. 4, if the module 260 successfully establishes communication with the initially-selected bus type (at block 412), the vehicle communication module 260 uses the selected bus to exchange data with the ECU 112 and sets the specified bus type as the "ACTIVE" type (at block 414). Alternatively, if the communication attempt fails (at block 412), the module 260 determines whether there are additional bus types to try (at block 416). If there are no additional types to attempt, the base unit 116 displays an error signal on the display unit 213 (at block 418). In some embodiments, the module 260 can be configured to re-try connections with one or more of the available bus types before generating an error signal (e.g., try connecting with each bus type at least twice before generating the error signal). Otherwise, while there are additional bus types to try (at block 416), the module 260 continues to attempt a connection with the ECU 112 over one of the communication interfaces 272 (at block 410).

As illustrated in FIG. 4, if the base unit 116 is reset (at block 420), the module 260 can be configured to automatically search for an available data bus as described above. For example, in some embodiments, when the base unit 116 is reset, the specified bus type can default to "UNKNOWN." Also, any time a user specifies a bus type different than the currently-set bus type, the base unit 116 can attempt to communicate using the specified bus type and, optionally, can automatically search for an available data bus if communication with the specified bus type fails (see blocks 404 and 406). In addition, to manually initiate an automatic search for an available data bus, a user can set the bus type to "UNKNOWN" or a similar default setting. Furthermore, in some embodiments, when the voltage of the battery powering the base unit 116 drops below a predetermined threshold (e.g., approximately 11 volts), the vehicle communication module 260 changes the number or order of bus types used for communication attempts. For example, when the battery voltage drops below a predetermined threshold, the base unit 116 can be configured to only attempt to communicate through a J1939 data bus or a J1708 data bus even if other bus types are available.

Active Data Source Identification

After the vehicle communication module 260 has established communication between the base unit 116 and the ECU 112 using a particular bus type, the base unit 116 receives vehicle data (i.e., vehicle operating parameters) from the ECU 112. In some embodiments, the vehicle data includes speed, hours of vehicle or engine operation, operating status, ignition state, trip distance, and total vehicle distance. The vehicle data from the ECU 112 can be generated by a plurality of data sources (e.g., a plurality of vehicle control modules). For example, vehicle data related to speed can be generated by both an engine control module (i.e., a first data source) and a transmission control module (i.e., a second data source). To accurately track operator compliance with driving regulations, the base unit 116 can select between the available data sources based on the availability and reliability of the vehicle data received from the data sources.

Figure 5:
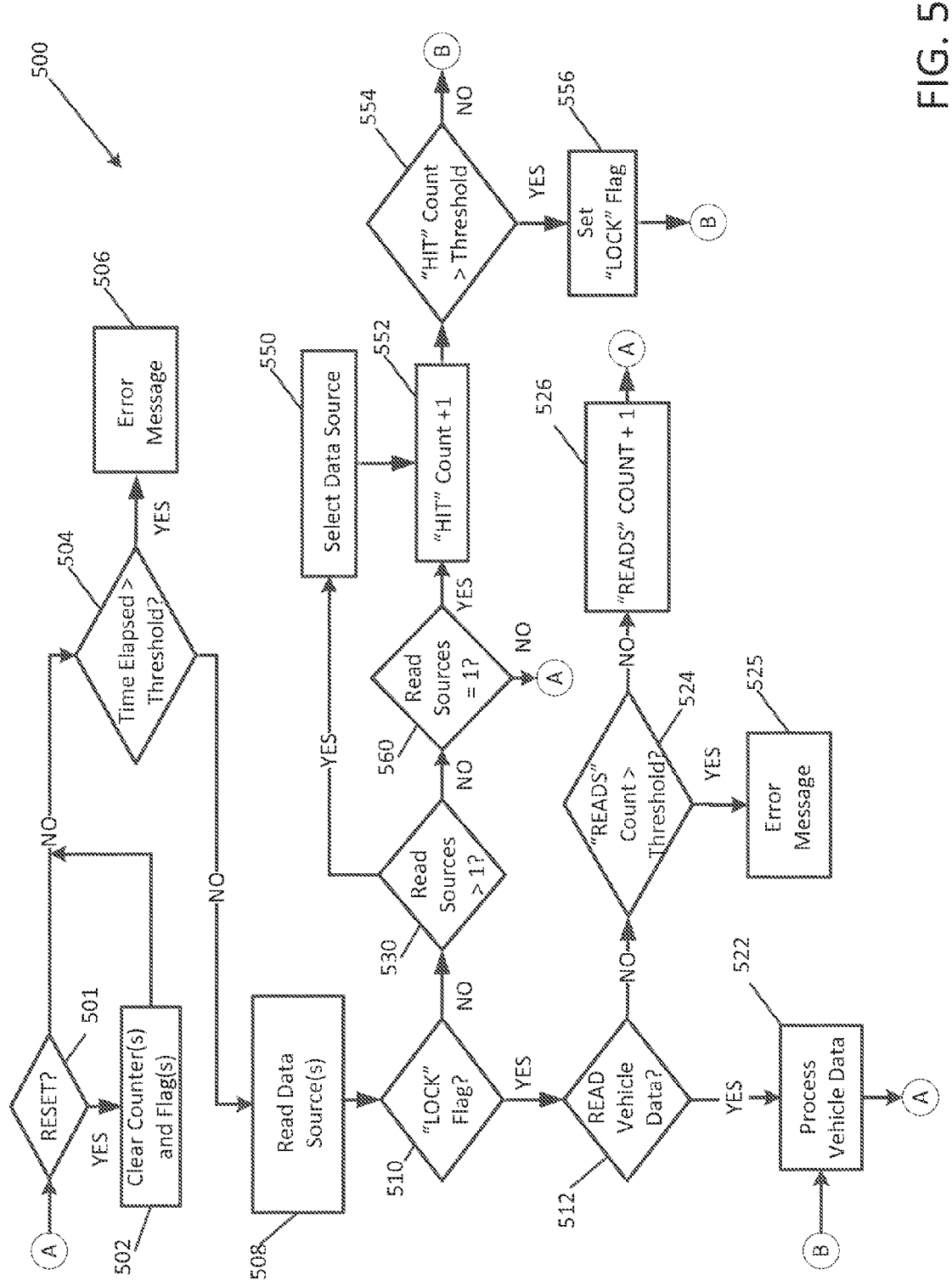
FIG. 5 is a flowchart illustrating a method implemented by the vehicle communication module of FIG. 3 to select a data source for receiving vehicle data.

For example, FIG. 5 illustrates a method 500 performed by the base unit (e.g., the vehicle communication module 260) for selecting a data source for receiving vehicle data. It should be understood that the method 500 can be used in combination with the method 400 described above. In some embodiments, the vehicle communication module 260 performs the method 500 each time the base unit 116 requests vehicle data from the ECU 112. As described in more detail below, using the method 500, the vehicle communication module 260 automatically determines the optimal data source from the ECU 112 based on the available data sources and predefined criteria (e.g., preferences).

In particular, to perform the method 500, the vehicle communication module 260 maintains a plurality of counters and flags to track the success of receiving vehicle data from a particular data source. For example, the module 260 can maintain a "HIT" counter that records how many times vehicle data has successfully been received from each data source. Therefore, each data source is associated with a "HIT" count. The module 260 also maintains a "LOCK" flag for each available data source. When the "LOCK" flag is set for a particular data source, the flag indicates that the associated data source should be used by the vehicle communication module 260 as the active data source (e.g., until an error or reset occurs). In some embodiments, as described above, the "LOCK" flag for a particular data source is set when the "HIT" counter for the data source exceeds a predetermined threshold (e.g., 2000 hits). It should be understood that rather than maintaining a "LOCK" flag for each data source, the module 260 can maintain a variable that is set to an identifier of the currently-active data source (or no identifier if no data source is currently set as the active data source).

Also, after a "LOCK" flag is set, the module 260 can be configured to use a "READS" counter to track the number of unsuccessful reads from an active data source. In some embodiments, the module 260 uses a single "READS" counter for the current active data source. In other embodiments, the module 260 maintains a "READS" counter for each data source. The "HIT" counters, "LOCK" flags, and "READS" counter(s) can be stored in the memory module 205 of the base unit 116. When the base unit 116 is reset (at block 501), the counters and flags stored in the memory module 205 can be rest (at block 502).

As illustrated in FIG. 5, as an initial step of the method 500, the vehicle communication module 260 determines how long it has been since vehicle data was received from the ECU 114 (i.e., over the communication interface 272 from any data source) and compares the determined time period to a threshold (e.g., five minutes) (at block 504). If the time period exceeds the threshold (at block 504), the vehicle communication module 260 returns an error message (at block 506).

If the time period does not exceed the limit (at block 504), the vehicle communication module 260 attempts to read vehicle data from each available data source (at block 508). The module 260 can maintain a list of available data sources that the module 260 can use to attempt a read of each available data source. The communication module 260 may get a response from zero, one, or more data sources. The module 260 can use the responses to identify when no data source is currently providing vehicle data (at block 504) and other errors.

The communication module 260 also identifies whether any data source is currently set as the active data source (e.g., if the "LOCK" flag associated with one of the data sources is set) (at block 510). If a data source is set as the active data source, the vehicle communication module 260 reads vehicle data from the active data source. If the module 260 successfully reads vehicle data from the active data source (at block 512), the base unit 116 processes the vehicle data from the active data source for compliance purposes (e.g., detecting drive events used for driver compliance logging) (at block 522).

If the module 260 does not successfully read vehicle data from the active data source (at block 512), the communication module 260 determines how many unsuccessful reads (i.e., read errors) have occurred for the active data source. As described above, the module 260 can track this number using a "READS" counter. For example, the module 260 can compare the "READS" counter to a threshold (e.g., 100 unsuccessful reads) (at block 524). If the "READS" counter exceeds the threshold (at block 524), the communication module 260 returns an error message (at block 525). In addition or as an alternative, the module 260 can reset one or more of counters and flags to initiate a search for a valid data source. In particular, the module 260 can reset the active data source by setting none of the plurality of data sources as the active data source (e.g., clearing the "LOCK" flag for active data source and clearing the "READS" counter associated with the active data source). Alternatively, if the "READS" counter is less than the threshold (at block 524), the module 260 increases the "READ" counter (e.g., by a value of 1) (at block 526).

As illustrated in FIG. 5, if the communication module 260 determines none of the plurality of data sources are set as the active data source (e.g., "LOCK" flag is not set for any of the plurality of data sources) (at block 510), the communication module 260 determines if a response was received from more than one of the plurality of vehicle data sources (at block 530).

If the module 260 receives a response from more than one of the plurality of vehicle data sources (at block 530), the communication module 260 selects one of the data sources from which to read vehicle data. In particular, the module 260 determines the data source to select using predefined criteria (at block 550). In particular, as described above, vehicle data from some vehicle control modules can be preferred for compliance purposes. For example, in some embodiments, vehicle speed data from the engine control module is preferred over vehicle speed data from the transmission control module. In some embodiments, the preferences are established based on the availability and reliability of vehicle data available from each data source. Accordingly, the communication module 260 uses the predefined criteria to select the data source most suitable for compliance purposes. For example, the module 260 can maintain a list of available data sources and a preferred order for the data sources, which may be implied by an order of the list or separately-stored preference data (e.g., an ordered list of data sources, wherein the order sequentially specifies the most preferred data source to the least preferred data source).

Accordingly, of those data sources providing vehicle data, the module 260 uses the predefined criteria to automatically identify the most preferred data source (at block 550). After identifying the most preferred data source, the module 260 increases the "HIT" counter (e.g., by a value of 1) associated with the most preferred data source (at block 552). The module 260 also compares the "HIT" counter to a threshold (at block 554). If the "HIT" counter is greater than a threshold (at block 554), the communication module 260 sets the preferred data source as the active data source (e.g., sets the "LOCK" flag for the data source) (at block 556) and processes the vehicle data (at block 522). In some embodiments, if the "HIT" counter is less than the threshold (at block 554), the module 260 processes the vehicle data from the preferred data source 272 (at block 522) without setting the preferred data source as the active data source.

Alternatively, if a response was not received from more than one data source (at block 530), the collection device determines if a response was received form a single data source (at block 560). If a response was received from only one data source (at block 560), the module 260 increments the "HIT" counter for that data source (e.g., by a value of 1) (at block 552). The collection device then compares the "HIT" counter to a threshold (at block 5654). If the "HIT" counter is greater than a threshold (at block 554), the communication module 260 sets the data source as the active data source (e.g., sets the "LOCK" flag for the data source) (at block 556) and processes the vehicle data (at block 522). In some embodiments, if the "HIT" counter is less than the threshold, the module 260 processes the vehicle data from the data source (at block 522) without setting the data source as the active data source.

Accordingly, using the method 500, the module 260 automatically determines an active data source for the base unit 116 (e.g., without requiring user input). However, if the active data source stops providing vehicle data (e.g., due to an error, etc.), the module 260 can use the method 500 to automatically set a different data source as the active data source. Thus, the method 400 allows a base unit 116 to be switched between different vehicles using different communication standards, and the method 500 improves the consistency of vehicle data received, avoids false error messages, and reduces the use of data bus 118 bandwidth by minimizing the amount of vehicle data being read.

As noted above, the base unit 116 collects data (e.g., vehicle data) from the ECU 112 (e.g., over the vehicle communication module 260) and transmits the data from the ECU 112 to at least one external device 120 (e.g., using the transceiver 252). In particular, the base unit 116 can be configured to obtain vehicle data from the ECU 112 at a predetermined frequency. Obtained data is stored to the memory module 205. When an external device 120 sends a request for data from the base unit 116, the base unit 116 logs the request, retrieves the data from the memory module 205, and communicates the retrieved data to the external device 120. The base unit 116 also logs other data related to the request to the memory module 205, such as the time span over which data was retrieved, the time the data was retrieved or time-stamped, and the size of the data that was delivered. In some embodiments, after data is transmitted to the external device 120, the data remains in the memory module 205 for a predetermined time period to prevent any loss of data. For example, in some embodiments, after the data is transferred to the external device 120, the data is marked extracted, transmitted, downloaded, or expired. Therefore, the memory module 205 stores a log of vehicle data and a log of data retrieval history.

In some embodiments, the base unit 116 is configured to operate in a GPS-only mode. When the base unit 116 operates in a GPS-only mode, the vehicle communication module 260 does not need to be connected to the diagnostic connector 220 of the vehicle 104. When the base unit 116 operates in the GPS-only mode, vehicle data (e.g., vehicle speed) is obtained exclusively from the GPS module 211 and the accelerometer 212. The base unit 116 also generates a synthetic odometer reading based on data from the GPS module 211 and the accelerometer 212. Similarly, the base unit 116 can derive the ignition switch state from data received from the accelerometer 212 and the GPS module 211. In some embodiments, when the base unit 116 operates in the GPS-only mode, vehicle data generated by the base unit 116 is transmitted to an external device 120 only when specifically requested from the external device 120 (e.g., upon a request for vehicle data collected during the GPS-only mode).

Telematics Adaptor

Figure 6:
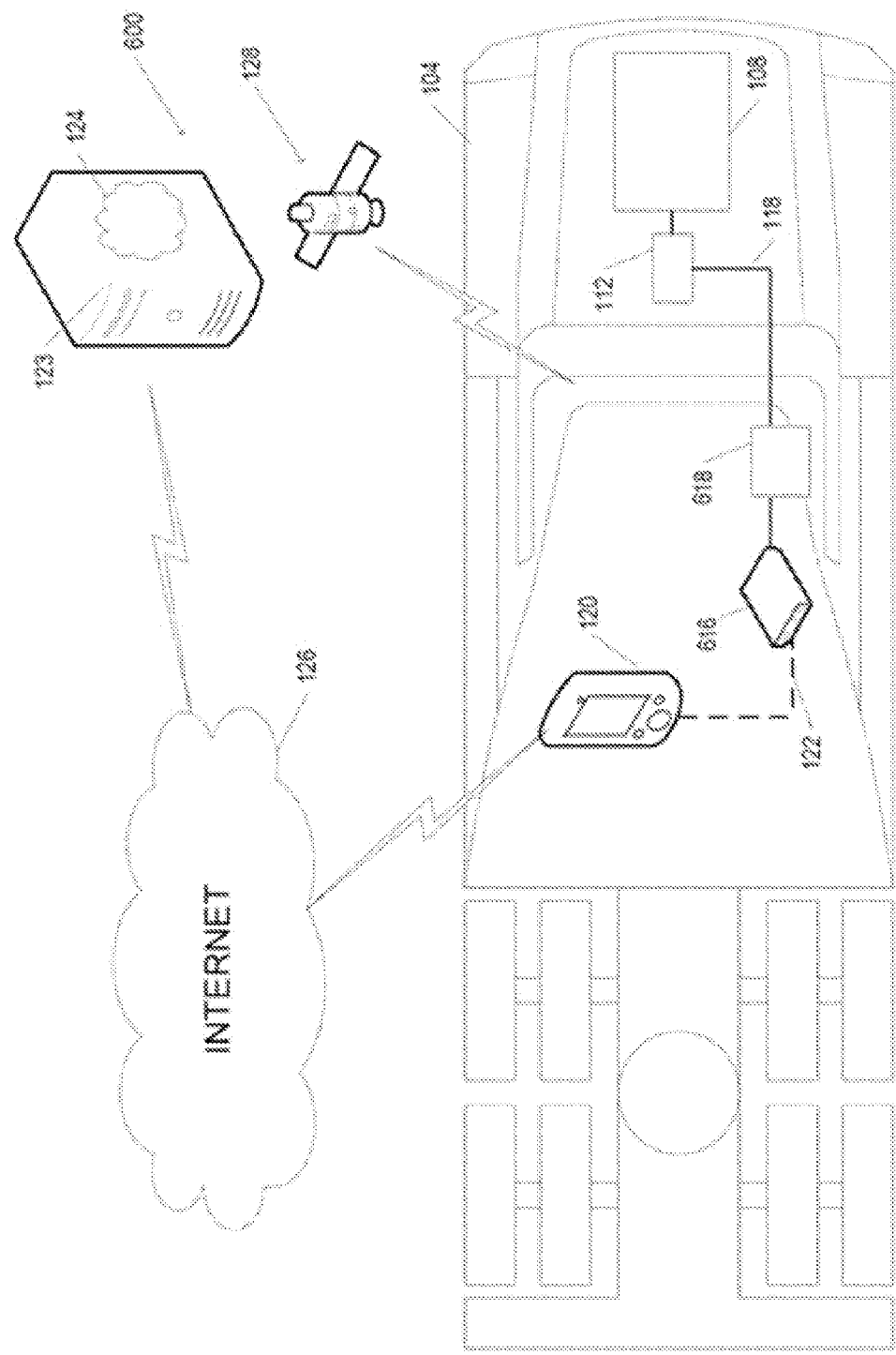
FIG. 6 schematically illustrates a driver performance monitoring system according to another embodiment of the invention.

In some embodiments, a vehicle may not be equipped with a base unit 116 as described above or an installed base unit 116 may be malfunctioning. In these situations, an adaptor can be used to capture vehicle data for compliance purposes. For example, FIG. 6 illustrates a performance monitoring system 600 according to another embodiment of the invention. The system 600 includes an adaptor 616, one or more external devices 120 (i.e., external to the adaptor 616), and a remote server 123 running a remote host application 124. The external devices 120, remote server 123, and remote host application 124 can function as described above. However, the adaptor 616 can be used in place of the base unit 116 and, in some embodiments, includes fewer components than the base unit 116.

For example, as illustrated in FIG. 6, the adaptor 616 can be physically coupled to a telematics device 618 included in the vehicle 104 (e.g., a navigation device). The telematics device 618 receives location data from one or more external satellites and, optionally, communicates with the ECU 112 through a data bus 118 to obtain vehicle data. In some embodiments, the telematics device 618 uses the vehicle data and the location data to provide driving directions to a driver of the vehicle 104.

Figure 7:
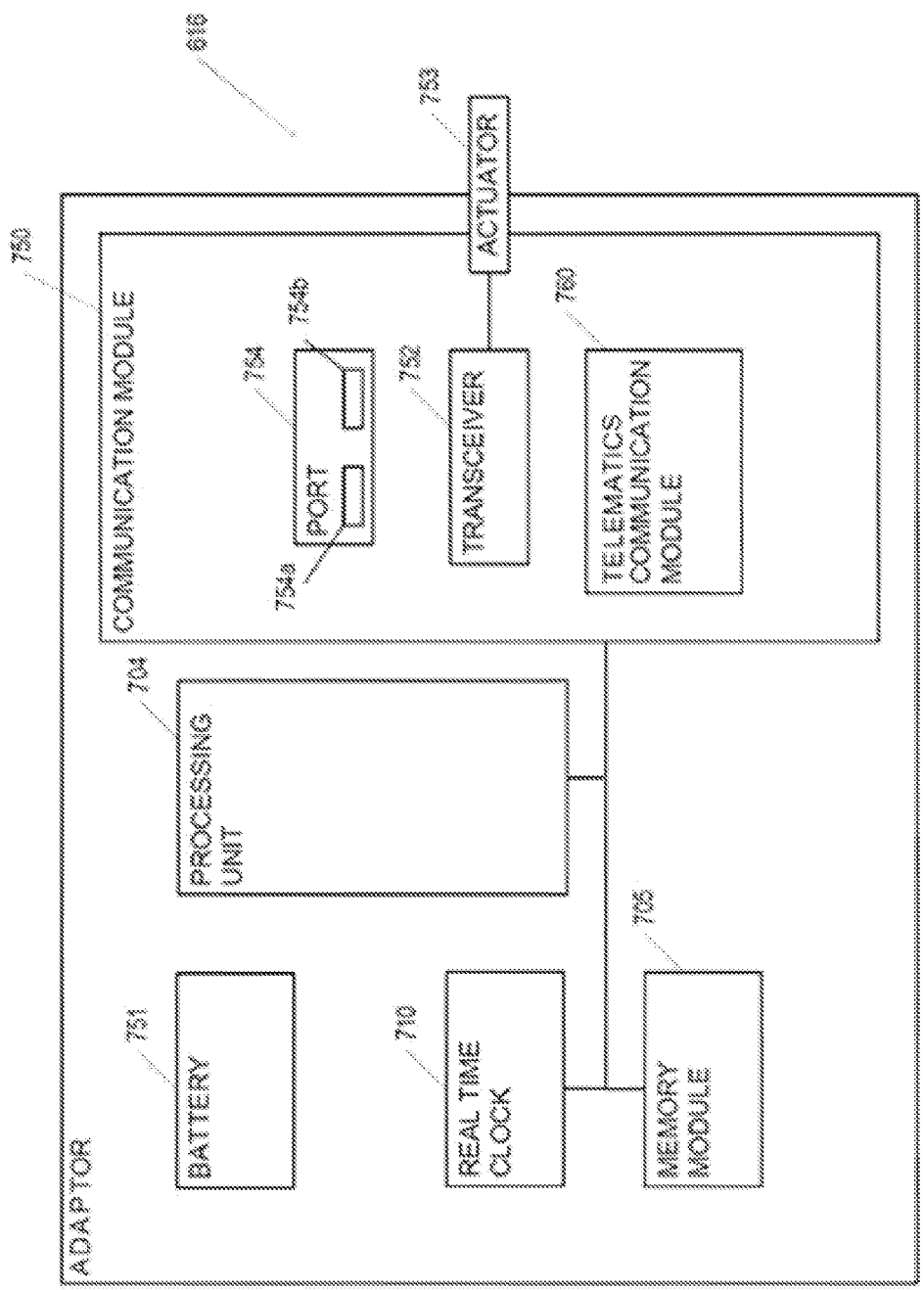
FIG. 7 schematically illustrates an adaptor included in the system of FIG. 6.

As illustrated in FIG. 7, in one embodiment, the adaptor 616 includes a processing unit 70 (such as a microprocessor, controller, or ASIC), at least one memory module 705, a real-time clock 710, and a communication module 750. In some embodiments, the adaptor 616 also includes a display unit, which can include an LED that provides a status indication to an operator. Accordingly, as compared to the base unit 116, in some embodiments, the adaptor 616 does not include a GPS module 211, or an accelerometer 212 as described above with respect to the base unit 116.

The processing unit 705 processes vehicle data and location data (received from the telematics device 618) to determine and store drive events. As described in more detail below, the adaptor 616 can transmit vehicle data, location, data, drive events, or a combination thereof to an external device 120.

The memory module 705 includes non-transitory computer readable medium, such as a non-volatile serial flash memory and volatile memory. As described above with respect to the memory module 205 of the base unit 116, the memory module 705 stores instructions that, when executed by the processing unit 704, log vehicle data, log data retrieval history, and process data received from the telematics device 618 and other devices and systems external to the adaptor 616. Accordingly, as described herein, the adaptor 616 performs particular functionality by executing instructions with the processing unit 704.

The real-time clock 710 provides a real-time clock function to allow the adaptor 616 to accurately determine a time with a predetermined resolution (e.g., approximately one second). The real-time clock 710 and the other components of the adaptor 616 are powered by the telematics device. Power is received by the adaptor 616 over the physical coupling to the telematics device 618. In some embodiments, the adaptor 616 also includes a battery 751 (e.g., a rechargeable battery) for providing power. As described below, the battery 751 can be charged using an external device 120 connected to the port 754.

The communication module 750 of the adaptor 616 can be similar to the communication module 250 of the base unit 116. As illustrated in FIG. 7, the communication module 750 includes a transceiver 752 for communicating data between the adaptor 616 and an external device 120 (i.e., external to the adaptor 616). The transceiver 752 can communicate with an external device 120 using a wired or wireless connection. For example, in some embodiments, the adaptor 616 communicates with an external device 120 using a Bluetooth connection. Accordingly, the wireless transceiver 752 can include a Bluetooth transceiver.

In some embodiments, the adaptor 616 also includes a connection actuator 753 (similar to the connection actuator 253 of the base unit 116). A user can move the actuator 753 to control when the adaptor 616 becomes discoverable or searchable. When the adaptor 616 is discoverable, an external device 120 can search for, discover, and couple to the adaptor 616. In some embodiments, the apparatus 616 (e.g., the connection actuator 753) includes one or more indicators (e.g., LEDs) (not shown) that indicate when the adaptor 616 is coupled to the external device 120.

The communication module 750 can also include a port 754. The port 754 allows the adaptor 616 to be physically coupled to the external device 120. For example, the port 754 can allow diagnostic data to be transmitted between the external device 120 and the adaptor 616. In some embodiments, the port 754 includes one or more serial (e.g., USB) connections. For example, the port 754 can include a first serial connection 754a and a second serial connection 754b. The first connection 754a is used to receive data from the external device 120 but does not provide a charging current to the adaptor 616. Therefore, the second connection 754b is used to provide a charging current to the adaptor 616 (i.e., the battery 751). By proving two separate connections, one for charging and one for data transmission, the adaptor 616 does not need to include an isolated DC power supply.

The diagnostic data transmitted through the port 754 can relate to the adaptor 616. Therefore, a user can couple an external device 120 to the port 754 to diagnose a malfunction occurring with the adaptor 616. Similarly, the port 754 can allow the adaptor 616 to be reconfigured, modified, or upgraded using an external device 120 (e.g., by receiving programming instructions from the external device 120).

The communication module 750 also includes a telematics communication module 760 that includes a connector for selectively physically coupling (e.g., attaching and detaching) the adaptor 616 to the telematics device 618. In some embodiments, the connector includes a RS-232 serial connection. In some embodiments, the adaptor 616 can be introduced into the vehicle 104 and connected to the telematics device 618 with minimal or no changes required to the telematics device 618. In other embodiments, firmware may be added to the telematics device 618 to communicate with the adaptor 616. However, the adaptor 616 can provide driver logging capabilities that the telematics device 618 does not provide.

In operation, when the adapter 616 is coupled to the telematics device 618, the telematics device 618 transmits vehicle data and/or location data to the adaptor 616. In some embodiments, the vehicle data transmitted from the telematics device 618 to the adaptor 616 is, for example, a speed of the vehicle 104, revolutions per minute of the engine 108, and an odometer value. In some embodiments, the location data transmitted from the telematics device 618 to the adaptor 616 is, for example, GPS coordinates (e.g., latitude and longitude coordinates), a directional heading, and a quality value (e.g., dilution of precision ("DOP")).

As noted above, the adaptor 616 is configured to relay accumulated data to one or more external devices 120. In addition to relaying data received from the telematics device 618 to an external device 120, the adapter 616 can be configured to process the data received from the telematics device 618, for example, performing time keeping and data logging. For example, in one embodiment, the adaptor 616 records and stores the vehicle data and the location data for complying with FMCSA regulations. In particular, the adaptor 616 can be configured to process vehicle and location data received from the telematics device 416 to detect a drive event used for driver compliance logging. Once an external device 120 is available, the adapter 616 transmits the processed data to the device 120 (e.g., a detected drive event). It should be understood that even when the transceiver 764 is transmitting vehicle data and location data to the external device 120, the adaptor 616 continues to monitor and record new vehicle data and new location data from the telematics device 618.

Figure 8A:
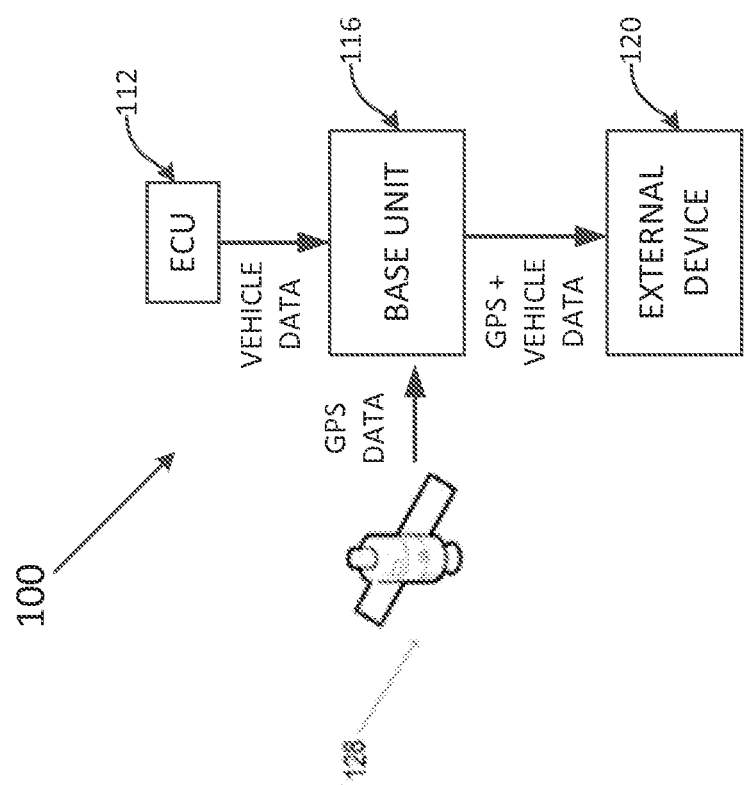
FIG. 8a illustrates data transmission using the driver performance monitoring system of FIG. 1.

FIGS. 8a and 8b illustrate similarities and differences between the driver performance system 100 and the alternative driver performance system 600 according to some embodiments of the invention. FIG. 8a illustrates data transmission using the system 100 (including the base unit 116), and FIG. 8b illustrates data transmission using the system 600 (including the adaptor 616).

As illustrated in FIG. 8a, the base unit 116 receives vehicle data from the ECU 112 of the vehicle 104. Separately, the base unit 116 receives location (e.g., GPS) data from one or more external satellites 128. The base unit 116 records and processes the received vehicle and location data and transmits the data to an external device 120.

As illustrated in FIG. 8b, the telematics device 618 receives vehicle data from the ECU 112 and receives location (e.g., GPS) data from the external satellites 128. The telematics device 618 transmits the vehicle and location data to the adaptor 616. In some embodiments, similar to the base unit 116, the adaptor 616 records and processes received data. The adaptor 616 also transmits the data to an external device 120.

Selective Location Data Transmission

The amount of data provided to the external device 120 (e.g., from the base unit 116 or the adaptor 616, collectively referred to in this section of the application as the "collection device") can be relatively large and, in some cases, can overburden the memory and/or processing resources of the external device 120. Similarly, the relatively large amount of data transmitted from the collection device to the external device 120 requires a relatively high bandwidth connection between the collection device and the external device 120. Meeting these memory and bandwidth requirements is difficult because, among other things, drivers may use a variety of external devices 120 in a BYOD architecture (e.g., different types of mobile phones, tablets, laptop computers, etc.). For example, even when an external device 120 meets minimum requirements, performance of the overall system 100, 600 can be unsatisfactory, particularly when compared to performance that may be achieved with external devices 120 that possess higher performance memory, processing, and connection capabilities.

For example, the collection device stores a large quantity of vehicle data (e.g., vehicle operating parameters) and location data (e.g., GPS records) during operation. As described above, the collection device exchanges data with one or more external devices 120. However, during operation, an external device 120 can become disconnected from the collection device (e.g., due to battery restrictions of the external device 120 or physical separation between the collection device and the external device). In these situations, the collection device continues to receive and store data even though the connection to the external device 120 has been lost. The collected data is eventually transmitted to the external device 120 when a connection is reestablished. Depending on the amount of time the external device 120 has been disconnected from the collection device, a large amount of data may need to be transmitted to the device 120 upon reconnection.

In some embodiments, only a portion of the data stored by the collection device (e.g., when the external device 120 was disconnected) is required for compliance purposes. Accordingly, transmitting all of the stored data to the external device 120 upon reconnection uses a large quantity of bandwidth and causes delays. Therefore, in some embodiments of the invention, only particular data is transmitted from the collection device to an external device 120 when the external device 120 connects to the collection device. In particular, in some embodiments, the collection device identifies what stored location data is required by the external device 120 to satisfy particular compliance requirements (e.g., determining if the vehicle 104 crossed a geographic boundary, fuel tax reporting, estimating mileage range, etc.). Accordingly, to reduce the amount of data transmitted to the external device 120, the collection device can select a subset of the stored data to transmit to the external device to satisfy compliance requirements while minimizing the amount of data transmitted.

Figure 9:
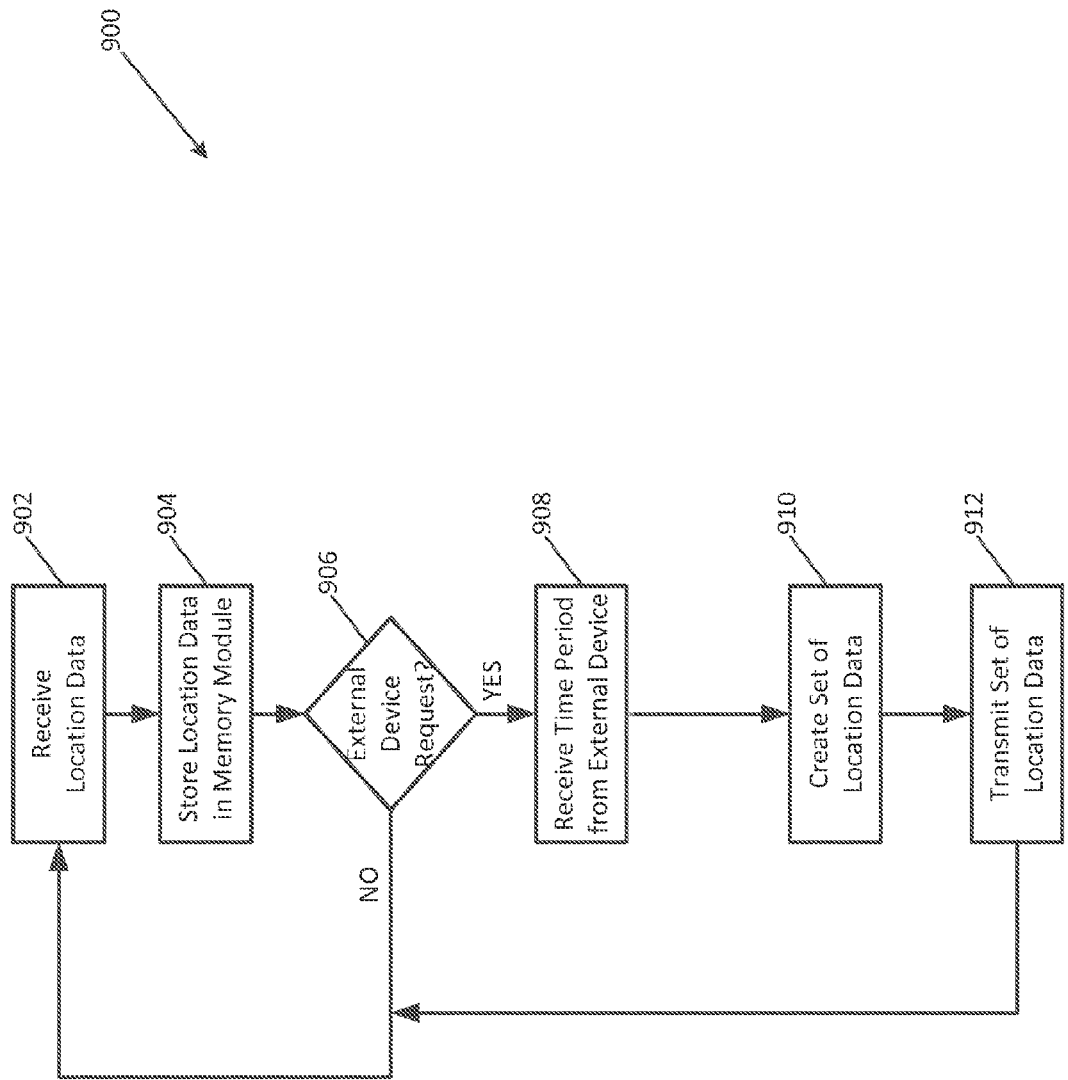
FIGS. 9 and 10 are flowcharts illustrating a method of selecting location data for transmission to an external device according to one embodiment of the invention.
Figure 10:
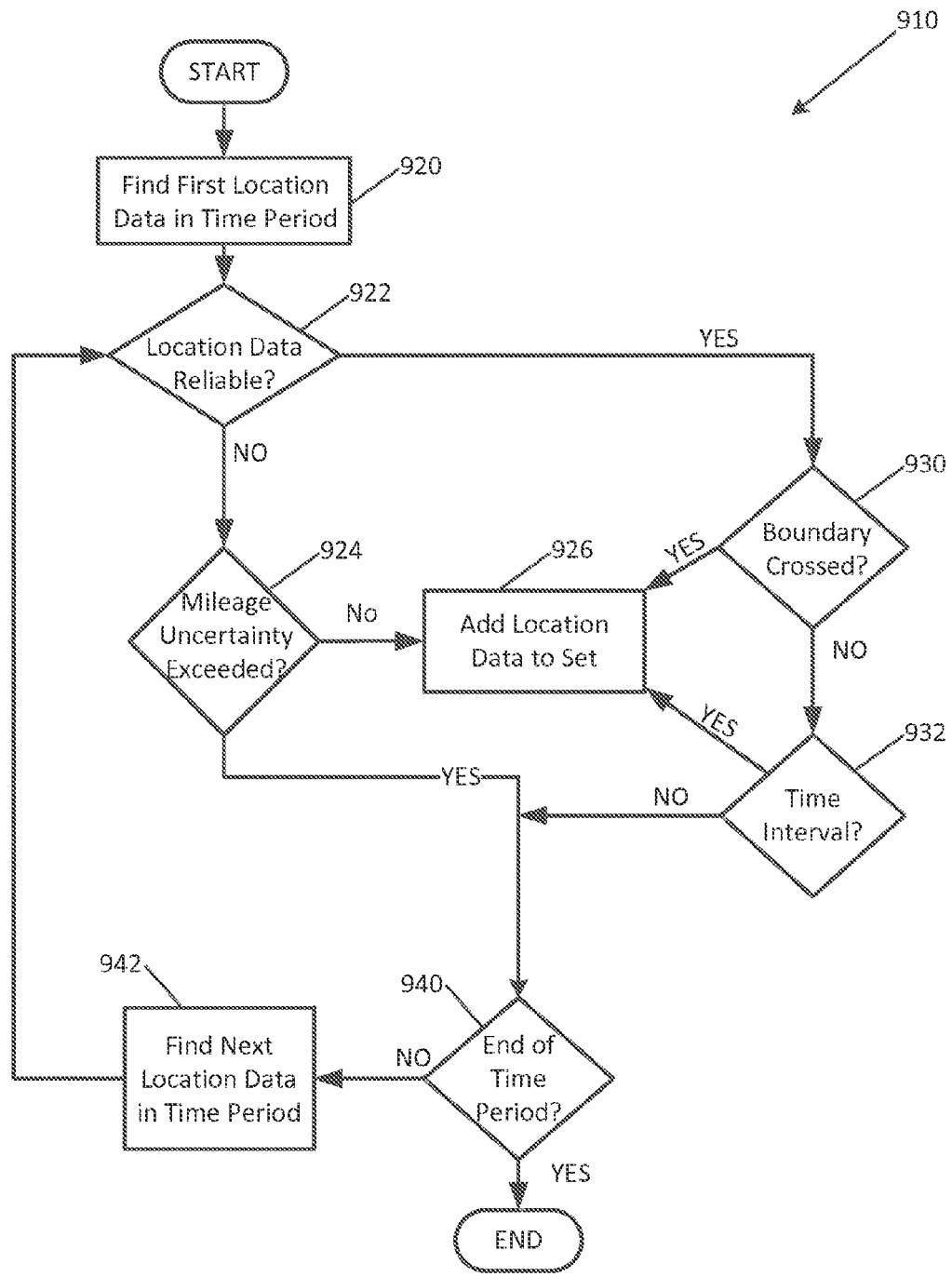

In particular, FIGS. 9 and 10 illustrate a method 900 performed by the collection device to select location data to transmit to the external device 120. Using the method 900 can increase the speed and reliability of transmitting location data from the collection device to the external device 120. For example, in some embodiments, using the method 900 can reduce a number of requests from the external device 120 to the collection device for location data, can select high quality location data for compliance purposes, and can identify geographic border crossings. In particular, in some embodiments, one request from the external device 120 to the collection device for location data can retrieve multiple sets of location data (e.g., up to six sets) using the method 900. For example, after the external device 120 has been disconnected from the collection device, the external device 120 can use one request to obtain multiple sets of location data, which allows the external device 120 to be updated without having to make a request for each individual set of location data.

As illustrated in FIG. 9, the method 900 includes receiving, with the collection device (e.g., from the GPS module 211 for the base unit 116 or from the telematics device 618 for the adaptor 616) location data at a variable interval (e.g., between every one and 20 seconds) (at block 902). The collection device stores the received location data (e.g., in the memory module 205 for the base unit 116 or in the memory module 705 for the adaptor 616) (at block 904). In some embodiments, the location data consists of GPS coordinates (e.g., latitude and longitude coordinates), a time, a quality value, and an odometer value.

As noted above, the collection device can receive and store location data continuously regardless of whether the external device 120 is connected to the collection device. However, once an external device 120 connects to the collection device, the device 120 can send a request for data to the collection device. Until the collection device receives such a request (at block 906), the collection device continues to receive and store location data.

The collection device also receives a time period associated with a request (at block 908). The time period can be the duration that the external device 120 has been disconnected from the collection device. In one embodiment, the time period includes a start time (e.g., when the external device 120 was initially disconnected from the collection device) and an end time (e.g., when the external device 120 was reconnected to the collection device or a different specified time, such as the end time of a driver's shift). In some embodiments, the end time may be set by default to the current time. It should also be understood that, in some embodiments, the collection device receives the time period (or a portion thereof) from the external device 120 making the request. However, in other embodiments, the collection device maintains the time period (or a portion thereof) for one or more external devices 120 (e.g., as default values or values specific to particular external devices 120 stored in internal memory). Allowing the external device 120 to specify the time period allows a user to specify a particular time period of interest. In addition to the time period, the collection device can receive a maximum number of location data items to return, a position reliability threshold, and a mileage uncertainty threshold associated with a request (e.g., from an external device 120 or from internal memory). The maximum number of location data items to return specifies a maximum number sets of location data can be provided in response to one request. For example, as noted above, in some embodiments, multiple sets of location can be provided in response to one request. Accordingly, the collection device can use the specified maximum number of location data items to return to identify how many sets of location data the collection device can include in response. Similarly, as described in more detail below, the collection device can use the position reliability threshold and the mileage uncertainty threshold to identify what sets of location data to include in the response.

After receiving the request and the associated request parameters (e.g., a time period, a maximum number of location data items to return, a position reliability threshold, and a mileage uncertainty threshold), the collection device creates a set of location data (at block 910). The collection device selects the set of location data from the instances of location data stored in memory, and, in many situations, the set does not contain all stored instances of location data. Rather, the collection device creates the set of location data based on the time period and other parameters associated with the request. As described in more detail below, the collection device can create an empty set and can add instances of location data to the set that satisfy the request. After processing all applicable instances of location data, the collection device transmits the set to the external device 120 making the request (e.g., as a packet) (at block 912).

For example, as illustrated in FIG. 10, the collection device identifies a first (e.g., in time) instance of stored location data that occurred during the time period associated with the request (at block 920). After identifying the first instance, the collection device uses a quality value included in the identified location data to determine a reliability of the identified location data (at block 922). Depending on the method used to acquire the location data (e.g., by the GPS module 211 or the telematics device 618), the degree of reliability of the location data changes. For example, GPS modules typically provide a quality value that designates how the GPS coordinates were obtained. In general, the lower the quality value, the lower the quality of the associated coordinates. For example, if the GPS module 211 receives an invalid location data or receives no information, the quality value can be set to zero, but if the GPS module 211 uses a GPS or a standard positioning service ("SPS") to obtain location data, the GPS quality value can be set to one. Similarly, if the GPS module 211 uses differential GPS ("DGPS"), the quality value can be set to two, and if the GPS module 211 uses a precise positioning service ("PPS"), the quality value can be set to three. As noted above, stored location data includes not only the GPS coordinates but also a quality value. Accordingly, the collection device can be configured to compare a quality value of a stored location to the position reliability threshold associated with the request (at block 922) to determine whether the location data is sufficiently reliable. Thus, the collection device can use the position reliability threshold to eliminate location data not meeting a particular reliability standard.

As illustrated in FIG. 10, if the location data is not sufficiently reliable based on the quality value (at block 922), the collection device determines a mileage uncertainty value for the location equal to the distance between the location data and the last location data associated with a GPS fix (i.e., the last set of location data generated when GPS signals were being received). The collection device compares the mileage uncertainty value associated with the location data to the mileage uncertainty threshold associated with the request (at block 924). If the mileage uncertainty value associated with the location data is less than the mileage uncertainty threshold associated with the request (at block 924), the collection device adds the location data instance to the set (at block 926). If the mileage uncertainty value associated with the location data exceeds the maximum uncertainty distance value associated with the request (at block 924), the collection device does not add the location data instance to the set. Thus, the collection device can use the mileage uncertainty value to add location data to the set that otherwise may not be added (e.g., due to reliability issues) to provide additional location details when exact positions or mileage are not available. However, the collection device only adds the location data when the location data represents a distance from the last GPS fix within a predetermined distance (i.e., the mileage uncertainty threshold). For example, if the mileage uncertainty threshold is 5 miles, the collection device adds the location data to the set if the mileage uncertainty value (i.e., distance between the instance of location data currently being evaluated and the last GPS fix) is less than or equal to 5 miles. If the mileage uncertainty value is greater than 5 miles, the location data is not added to the set (e.g., because the location data was generated too far from the last GPS fix).

If the identified location data is sufficiently reliable (at block 922), the collection device determines whether the location data indicates the crossing of a geographic boundary by the vehicle 104 (at block 930). The geographic boundary can be an international border, a U.S. state border, or any defined geo-fence. A geo-fence can indicate, for example, a predefined set of delivery boundaries. If the collection device determines that the location data indicates the crossing of a geographic boundary, the collection device adds the location data to the set (see block 926).

If the location data does not indicate the crossing of a geographic boundary (at block 930), the collection device determines the time associated with the last (i.e., in time) location data included in the set. If the difference between the time associated with the currently-analyzed location data and the time associated with the last location data included in the set exceeds a threshold (e.g., 15 minutes) (at block 932), the collection device adds the location data to the set (at block 926). The threshold can be specified by the collection device when making the request for location data. For example, to ensure that the external device 120 making the request receives adequate data, the collection device can add location data to the set (even if a boundary hasn't been crossed) to prevent too large of a time gap from occurring within the set. If the difference between these times does not exceed the predetermined time interval (at block 932), the collection device does not add the location data to the set. It should be understood that, in some embodiments, the external device 120 making the request specifies the time threshold (at block 932). In other embodiments, the collection device stores a default threshold.

As illustrated in FIG. 10, after analyzing an instance of location data (e.g., for reliability, mileage uncertainty, boundary crossing, etc.) and adding the location data to the set if applicable, the collection device identifies the next instance of location data to analyze. In particular, the collection device can identify whether the currently-analyzed location data is associated with the end time of the request (at block 940). If the currently-analyzed location data is associated with the end time, the collection device determines that no further instances of location data will satisfy the request, and the collection device transmits the generated set to the external device 120 making the request (at block 912, see FIG. 9). Alternatively, if the currently-analyzed location data is not associated with the end time, the collection device identifies the next available instance of location data (at block 942, see FIG. 10). The collection device then repeats the above analysis on the newly-identified instance and adds the instance of the location data to the set if applicable (at block 940).

Accordingly, the method 900 allows the external device 120 to receive stored location data from the collection device (e.g., after reconnection of a previous disconnection). In particular, using the method 900, the collection device evaluates stored location data to determine what location data is necessary for the external device 120 for compliance purposes and generates a set of location data to transmit to the device 120 (e.g., rather than transmitting individual instances of location data).

Selective Drive Event Transmission

As described above, the amount of data provided to the external device 120 (e.g., from the base unit 116 or the adaptor 616, collectively referred to in this section of the application as the "collection device") can be relatively large and, in some cases, can overburden the memory and/or processing resources of the external device 120. Similarly, the relatively large amount of data transmitted from the collection device to the external device 120 requires a relatively high bandwidth connection between the collection device and the external device 120.

For example, the collection device stores a large quantity of vehicle data (i.e., operating parameters) and location data (e.g., GPS records) during operation. In some embodiments, the vehicle data includes speed, hours of vehicle or engine operation, operating status, ignition state, trip distance, and total vehicle distance. The collection device can be configured to detect drive events based on collected vehicle data. A drive event includes, for example, a "drive-on" event, a "drive-off" event, a "stop" event, a "move" event, and an "ignition-on" event. A "drive-on" event occurs when the driver starts operating a vehicle 104 (e.g., starts a new trip). In some embodiment, a "drive-on" event occurs after the vehicle 104 travels a predetermined distance (e.g., 0.5 miles) after a "move" event or after the vehicle 104 reaches a predetermined speed (e.g., 5 miles per hour) after a "move" event. Similarly, a "drive-off" event occurs when the driver stops operating the vehicle 104 (e.g., ends a current trip). In some embodiments, the collection device uses a state machine to detect a drive event. Upon detecting an event, the collection device stores the event. Stored events can also include operating events of the collection device, including a reset event representing a reset (e.g., manual or otherwise) of the collection device.

When the collection device is connected to an external device 120, the collection device can transmit a stored drive event to the external device 120. However, during operation, an external device 120 can become disconnected from the collection device (e.g., due to battery restrictions of the external device 120 or physical separation between the collection device and the external device). In these situations, the collection device continues to receive, detect and store data even though the connection to the external device 120 has been lost. The collected data is eventually transmitted to the external device 120 when a connection is reestablished. Depending on the amount of time the external device 120 has been disconnected from the collection device, a large amount of data may need to be transmitted to the device 120 upon reconnection.

In some embodiments, only a portion of the drive events stored by the collection device may be required for compliance purposes. Accordingly, transmitting all of the stored drive events to the external device 120 upon reconnection uses a large quantity of bandwidth and may cause unnecessary delay. Therefore, to reduce the amount of data transmitted to the external device 120, the collection device can select a subset of stored data to transmit to the external device to satisfy compliance requirements while minimizing the amount of data transmitted. Therefore, in some embodiments of the invention, only particular drive events are transmitted from the collection device to an external device 120 when the external device 120 connects with the collection device (e.g., only those drive events needed for complying with driver requirements, such as hours-of-service logging).

In particular, FIGS. 11 and 12a-c illustrate a method 1100 performed by the collection device to select drive events to transmit to the external device 120. Using the method 1100 can increase the speed and reliability of transmitting drive events from the collection device to the external device 120. For example, instead of transmitting all driving events to the external device 120, the collection device can select and transmit only relevant driving events (e.g., "drive-on" event and "drive-off" event), which reduces the number of requests for drive events.

Figure 11:
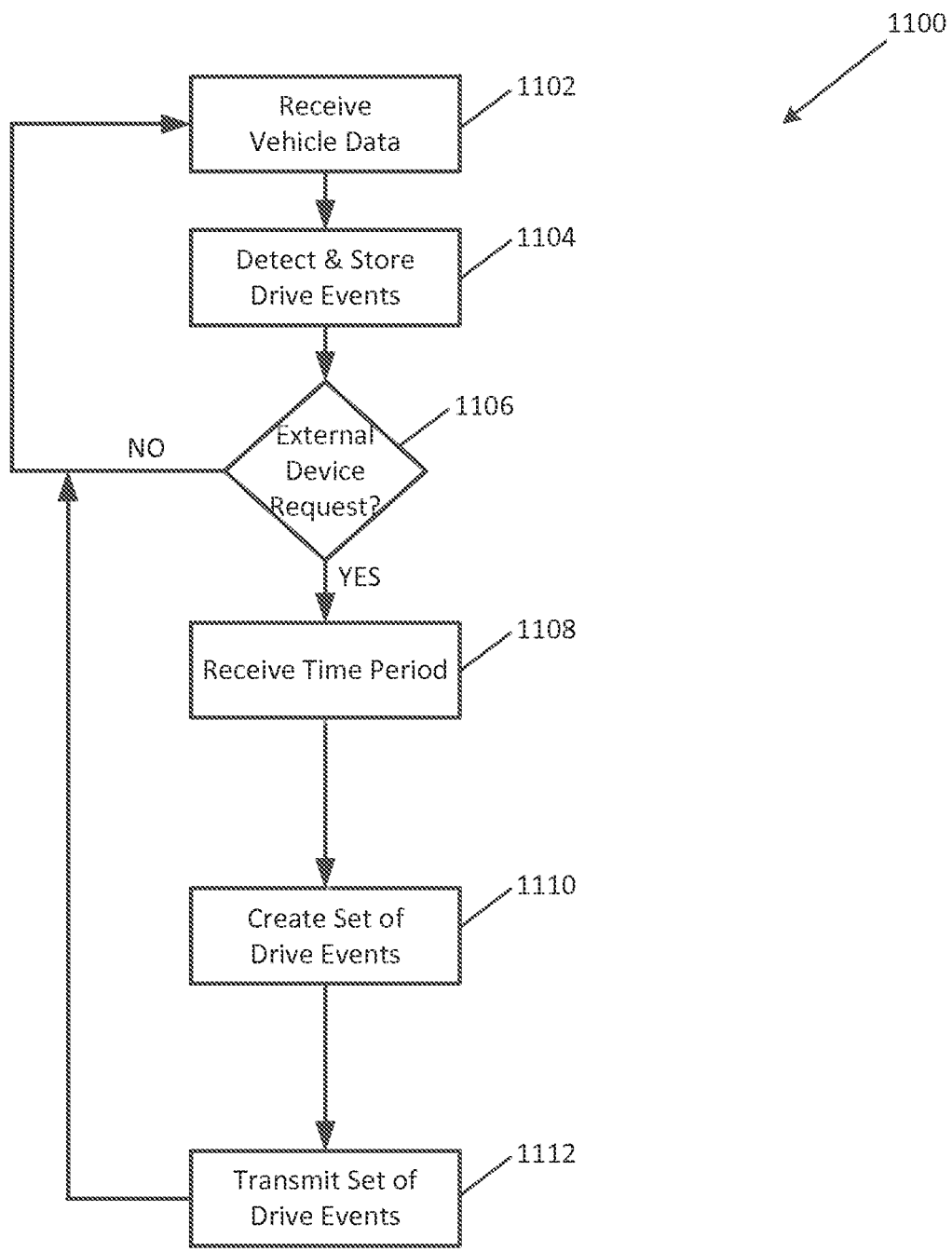
FIGS. 11 and 12a-c are flowcharts illustrating a method of selecting drive events for transmission to an external device according to one embodiment of the invention.

As illustrated in FIG. 11, the method 1100 includes receiving, with the collection device (e.g., from the data bus 118 for the base unit 116 or from the telematics device 618 for the adaptor 616) a plurality of instances of vehicle data at a variable interval (e.g., between every one and 20 seconds) (at block 1102). The collection device detects drive events based on the plurality of instances of vehicle data and stores the drive events (e.g., in the memory module 205 for the base unit 116 or in the memory module 705 for the adaptor 616) (at block 1104).

As noted above, the collection device can receive and store data continuously regardless of whether the external device 120 is connected to the collection device. However, once an external device 120 connects to the collection device, the device 120 can send a request for data to the collection device. Until the collection device receives such a request (at block 1106), the collection device continues to receive and store data.

The collection device also receives a time period for a request (at block 1108). The time period can be the duration that the external device 120 has been disconnected from the collection device. In one embodiment, the time period includes a start time (e.g., when the external device 120 was initially disconnected from the collection device) and an end time (e.g., when the external device 120 was reconnected to the collection device or a different specified time, such as the end time of a driver's shift). In some embodiments, the end time may be set by default to the current time. It should also be understood that in some embodiments, the collection device receives the time period from the external device 120 making the request. However, in other embodiments, the collection device maintains this information for one or more external devices 120 (e.g., as default values or values specific to particular external devices 120). Allowing the external device 120 to specify the time period allows a user to specify a particular time period of interest. In addition to the time period, the collection device can receive a minimum stop value associated with a request (e.g., from an external device 120). The minimum stop value specifies a minimum elapsed time between a "DRIVE-OFF" event and a subsequent "DRIVE-ON" event. Accordingly, based on the minimum stop value, the collection device can ignore (and, therefore, not transmit) certain events (e.g., events that are not required for compliance logging). It should be understood that the external device 120 can specify the minimum stop value (e.g., as part of the request) or the collection device can store such as value (e.g., as a default threshold or a threshold associated with a particular external device 120).

After receiving the request and the associated request parameters (e.g., a time period and a minimum stop value), the collection device creates a set of drive events that satisfies the request (at block 1110). The collection device selects the set of drive events from the drive events stored in memory and, in some situations, the set does not contain all the drive events stored in memory. The set of drive events is selected based on the time period and other parameters associated with the request. As described in more detail below, the collection device can create an empty set and can add drive events and other data to the set that satisfy the request. After processing all applicable stored data, the collection device transmits the set to the external device 120 making the request (e.g., as a packet) (at block 1112).

Figure 12A:
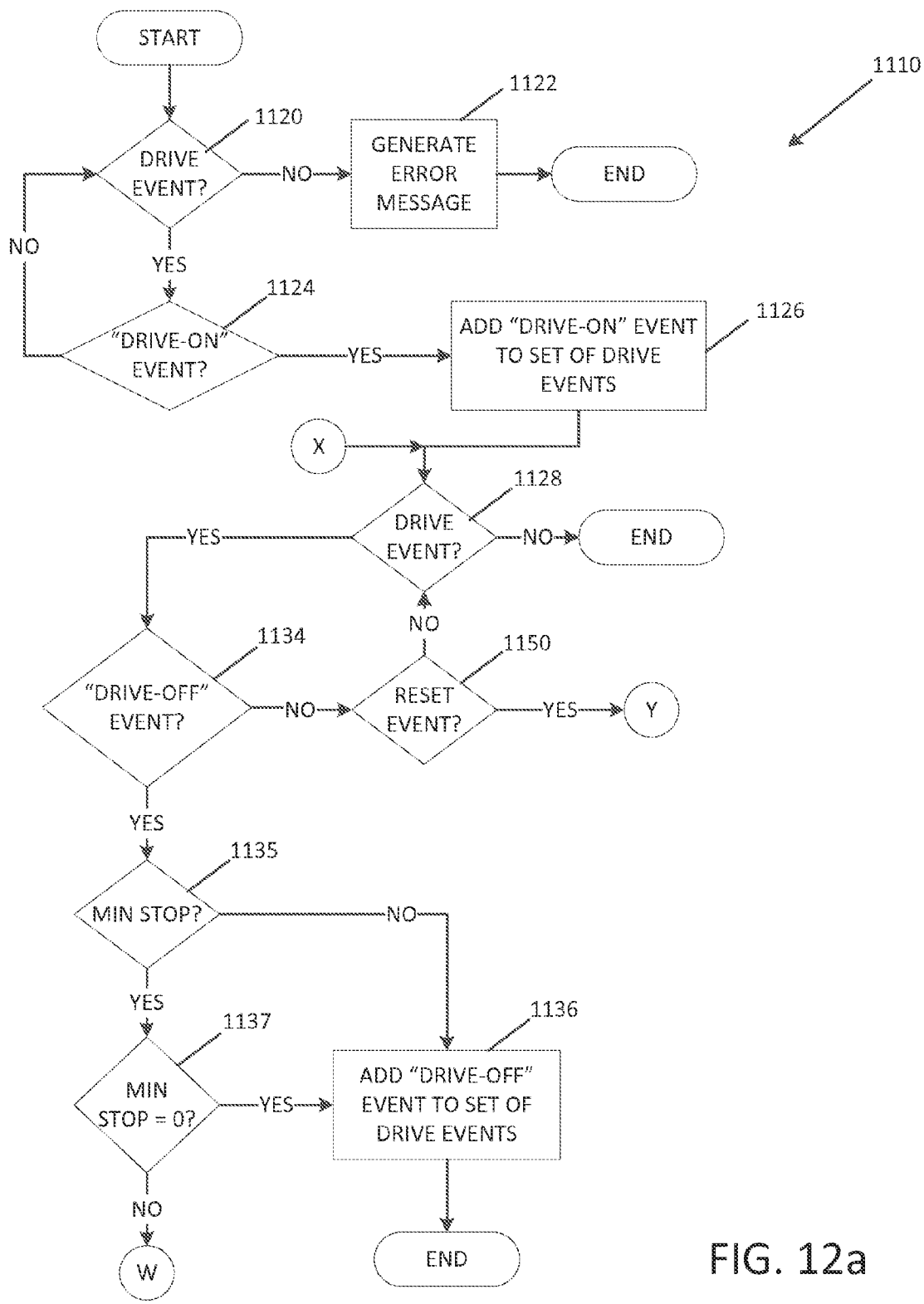

For example, as illustrated in FIG. 12a, to create the set of drive events (at block 1110), the collection device attempts to identify a yet-to-be processed stored drive event occurring during the time period (e.g., first in time occurring after the start time and before the end time that has not yet been processed by the collection device for the current request) (at block 1120). If the collection device does not find any unprocessed drive events during the time period, the collection device generates an error message or indication, which can be transmitted to the external device 120 making the request (at block 1122).

If the collection device finds a drive event (at block 1120), the collection device determines whether the drive event is a "DRIVE-ON" event (at block 1124). If the event is not a "DRIVE-ON" event, the collection device finds the next yet-to-be-processed drive event occurring during the time period (at block 1120) until a "DRIVE-ON" event is identified (at block 1124). If no "DRIVE-ON" event is found within the time period, the collection device generates an error message (at block 1122).

When a "DRIVE-ON" event is found (at block 1124), the collection device adds the "DRIVE-ON" event to the set of drive events (at block 1126). After adding the "DRIVE-ON" event data to the set, the collection device attempts to identify an associated "DRIVE-OFF" event occurring within the time period. In particular, as illustrated in FIG. 12a, the collection device identifies the next yet-to-be-processed drive event occurring during the period (at block 1128). If there is no next event to analyze (e.g., stored in the collection device or occurring within the specified time period), the collection device transmits the set of drive events (consisting of the "DRIVE-ON" event) to the external device 120 (at block 1112, see FIG. 11).

If a next drive event is available (at block 1128), the collection device determines whether the next drive event is a "DRIVE-OFF" event (at block 1134). If the next drive event is a "DRIVE-OFF" event, the collection device determines if a minimum stop value is associated with the request (at block 1135). If no minimum stop value was specified, the collection device adds the "DRIVE-OFF" event to the set of drive events (at block 1136), and the collection device transmits the set of drive events (consisting of the "DRIVE-ON" event and the "DRIVE-OFF" event) to the external device 120 (at block 1112, see FIG. 11).

If a minimum stop value was specified (at block 1135), the collection device determines whether the minimum stop value is set to zero (at block 1137). If the minimum stop value is set to zero, the collection device adds the "DRIVE-OFF" event to the set of drive events (at block 1136), and the collection device transmits the set of drive events (consisting of the "DRIVE-ON" event and the "DRIVE-OFF" event) to the external device 120 (at block 1112, see FIG. 11).

Figure 12B:
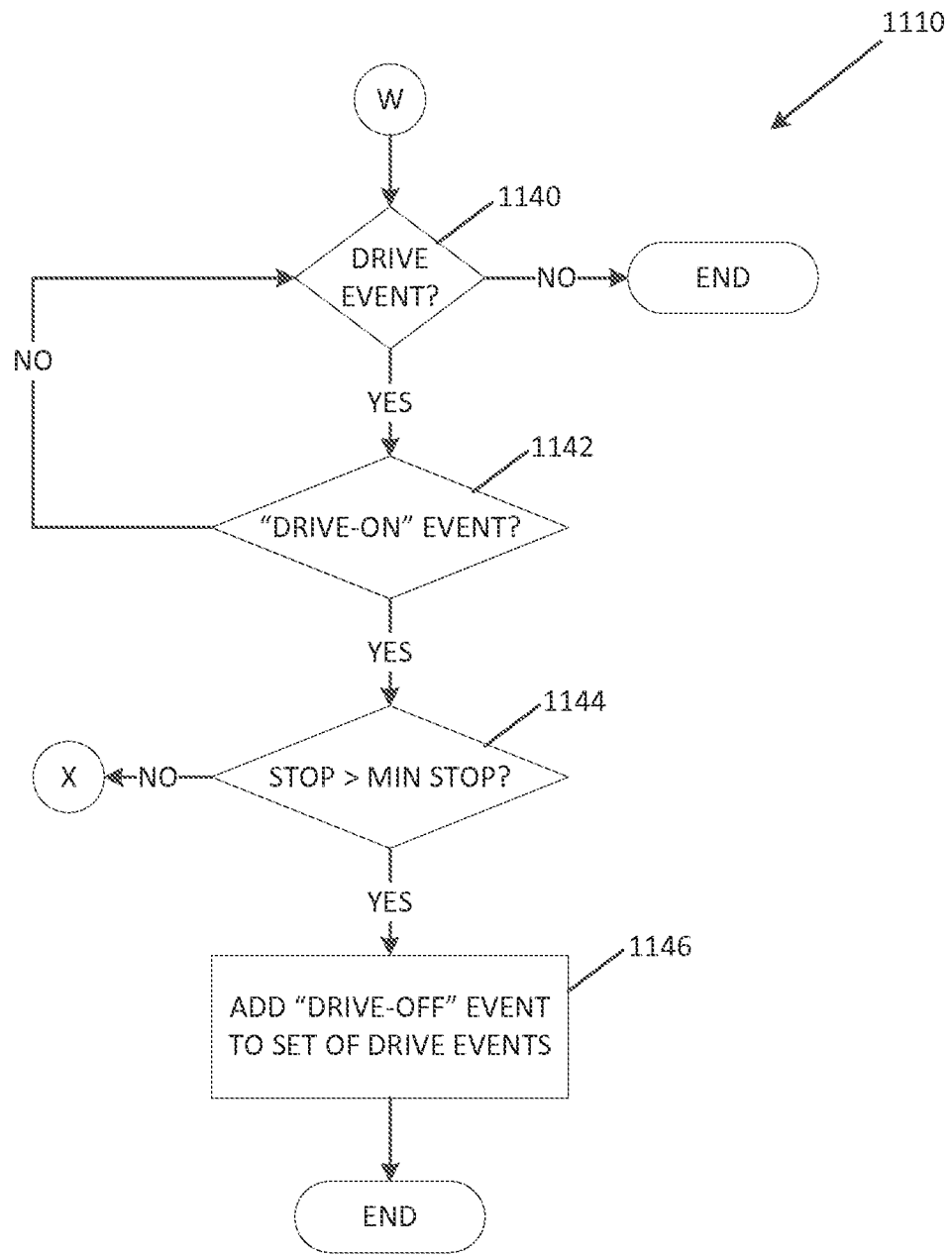

If a minimum stop value was received from the external device 120 (at block 1135) but the value is not set to zero (e.g., is greater than zero) (at block 1137), the collection device attempts to identify a subsequent "DRIVE-ON" event to determine how long the vehicle 104 was stopped and whether the stop time satisfies the minimum stop value. In particular, as illustrated in FIG. 12b, the collection device identifies the next yet-to-be-processed drive event occurring during the time period (at block 1140). If the collection device does not find a next drive event, the collection device transmits the set of drive events (e.g., consisting of the "DRIVE-ON" event and the "DRIVE-OFF" event) to the external device 120 (at block 1112, see FIG. 11).

If the collection device finds another drive event, the collection device determines whether the drive event is a "DRIVE-ON" event (at block 1142). If the next drive event is not a "DRIVE-ON" event, the collection device attempts to find another drive event (at block 1140). As noted above, if the collection device does not find another drive event occurring during the time period (at block 1140), the collection device transmits the set of drive events (e.g., consisting of the "DRIVE-ON" event and the "DRIVE-OFF" event) to the external device 120 (at block 1112, see FIG. 11).

Alternatively, if an identified drive event is a "DRIVE-ON" event (at block 1142), the collection device determines a "STOP" time and compares the "STOP" time to the minimum stop value associated with the request (at block 1144). The "STOP" time represents the amount of time between the currently-identified "DRIVE-ON" event (at block 1142) and the previously-identified "DRIVE-OFF" event (at block 1134). If the "STOP" time exceeds the minimum stop value, the collection device adds the previously-identified "DRIVE-OFF" event (at block 1134) to the set of drive events (at block 1146), and the collection device transmits the set of drive events (consisting of the "DRIVE-ON" event and the "DRIVE-OFF" event) to the external device 120 (at block 1112, see FIG. 11). If the "STOP" time is less than the minimum stop value (at block 1144), the collection device attempts to identify whether a different "DRIVE-OFF" event occurred during the time period (at block 1128).

If, after finding a "DRIVE-ON" event (at block 1124, see FIG. 12a), another drive event is identified (at block 1128) but the event is not a "DRIVE-OFF" event (at block 1134), the collection device determines whether the drive event is a reset event (at block 1150). A reset event represents a reset of the collection device, and can be stored in the collection device like a drive event. If the next drive event is not a reset event, the collection device attempts to find the next drive event (at block 1128).

Figure 12C:
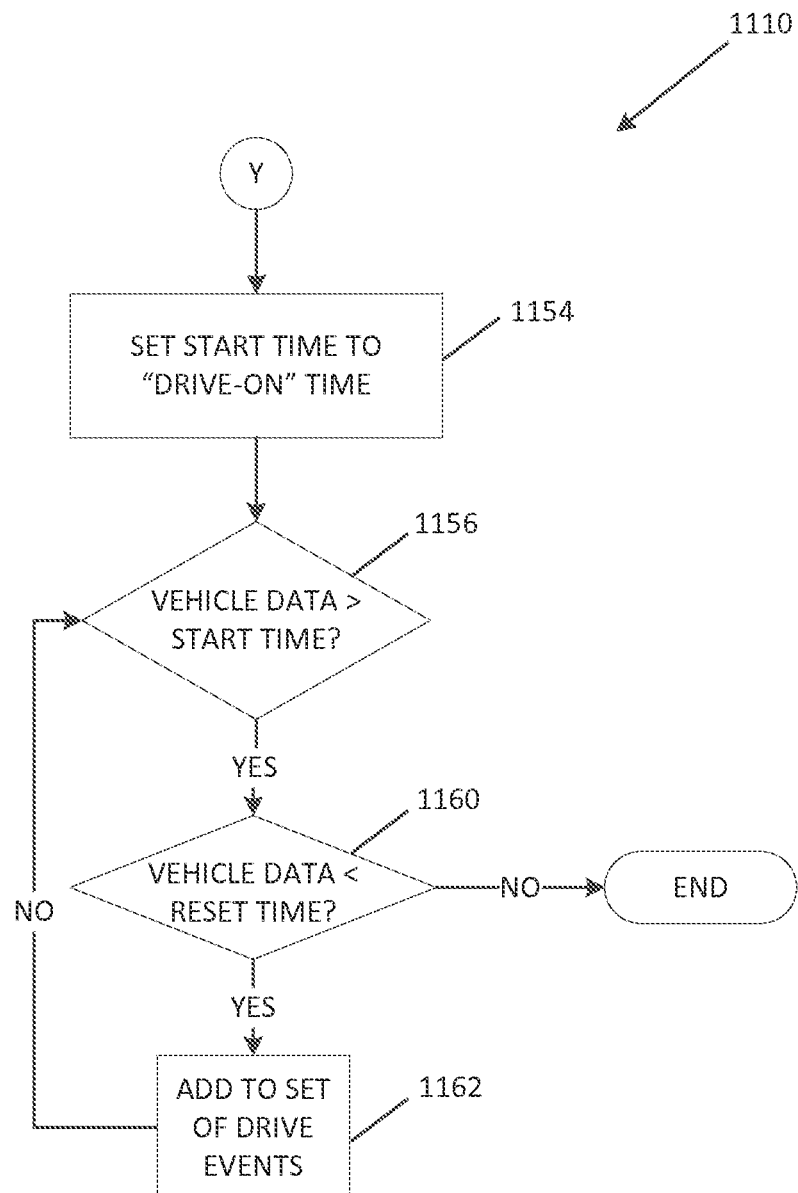

If the next drive event is a reset event (at block 1150), the collection device sets the start time associated with the request to the time associated with the previously-identified (at block 1124) "DRIVE-ON" event (at block 1154, see FIG. 12c). The collection device then sequentially identifies stored vehicle data occurring after the start time (at block 1156). For identified vehicle data occurring after the start time, the collection device compares the time associated with the vehicle data to the time associated with the reset event. If the vehicle data is associated with a time less than the time associated with the reset event (at block 1160), the collection device adds the vehicle data to the set of drive events (at block 1162), and the collection device continues identifying vehicle data occurring after the start time (at block 1156). Once the collection device finds vehicle data occurring after the time associated with the reset event (at block 1160), the collection device transmits the set of drive events (including the "DRIVE-ON" event and the vehicle data collected by the collection device occurring after the "DRIVE-ON" event but before the rest event) to the external device 120 making the request (at block 1112, see FIG. 11).

The collection device can repeat the method 1100 to provide the external device 120 making the request with each "DRIVE-ON" and/or "DRIVE-OFF" event (and any data associated with a reset) until all such events and associated data have been sent to the external device 120 for the requested time period.

Accordingly, the method 1100 allows the external device 120 to receive stored drive events from the collection device (e.g., after reconnection of a previous disconnection). In particular, using the method 1100, the collection device evaluates stored drive events to determine what drive events are necessary for the external device 120 for compliance purposes and generates a set of drive events to transmit to the device 120 as a packet (e.g., rather than transmitting individual drive events). In particular, in some embodiments, an external device 120 only requires specific events or event pairs (e.g., sequential "DRIVE-ON" and "DRIVE-OFF" events) satisfying particular parameters (e.g., a stop time exceeding a predetermined threshold). Similarly, if a reset occurred during the time period associated with a request, the collection device can provide the external device 120 with an applicable event occurring before the reset (e.g., a "DRIVE-ON" event) and vehicle data occurring between the event and the reset. This information may be useful for tracking events occurring around a reset of the collection device.

Thus, the invention provides, among other things, systems and methods for providing driver logging and compliance.

Various features and advantages of the invention are set forth in the following claims.

What is claimed is:

1. An apparatus installed in a vehicle, the apparatus comprising:
a processing unit configured to
selectively receive vehicle data from a plurality of data sources communicating with at least one communication interface included in the vehicle,
determine whether a data source is set as an active data source,
when a data source is set as the active data source, process vehicle data from the active data source when vehicle data is available from the active data source,
when no data source is set as the active data source,
identify a preferred data source of the plurality of data sources based on predefined criteria,
increment a counter associated with the preferred data source,
compare the counter to a threshold,
when the counter exceeds the threshold, set the preferred data source as the active data source, and
process the vehicle data received from the preferred data source.

2. The apparatus of claim 1, wherein the processing unit is further configured to, when a data source is set as the active data source and when vehicle data is not available from the active data source, compare a counter tracking unsuccessful reads from the active data source to a threshold, increment the counter when the counter does not exceed the threshold, and set no data source as the active data source when the counter exceeds the threshold.

3. The apparatus of claim 1, wherein each of the plurality of data sources includes a different vehicle control module.

4. The apparatus of claim 3, wherein the predefined criteria includes an ordered list of data sources.

5. The apparatus of claim 1, wherein the processing unit processes the vehicle data to detect a drive event.

6. A vehicle communication system, the system comprising:
a communication interface configured to communicate with a plurality of data sources;
a memory module configured to store a counter associated with each of the plurality of data sources; and
a processing unit configured to
receive vehicle data from at least one of the plurality of data sources,
determine whether one of the plurality of data sources is set as an active data source,
when one of the plurality of data sources is set as the active data source, process vehicle data from the active data source when vehicle data is available from the active data source, when none of the plurality of data sources are set as the active data source and the at least one of the plurality of data sources includes a single data source,
increment the counter associated with the single data source,
compare the counter to a threshold,
when the counter exceeds the threshold, set the single data source as the active data source, and
process the vehicle data received from the single data source.

7. The vehicle communication system of claim 6, wherein the processing unit is further configured to, when none of the plurality of data sources are set as the active data source and the at least one of the plurality of data sources includes multiple data sources, identify a preferred data source of the multiple data sources based on predefined criteria, increment a counter associated with preferred data source, compare the counter to a threshold, set the preferred data source as the active data source when the counter exceeds the threshold, and process the vehicle data received from the preferred data source.

8. The vehicle communication system of claim 6, wherein the processing unit is further configured to, when one of the plurality of data sources is set as the active data source and when vehicle data is not available from the active data source, compare a counter tracking unsuccessful reads from the active data source to a threshold, increment the counter when the counter does not exceed the threshold, and set none of the plurality of data sources as the active data source when the counter exceeds the threshold.

9. The vehicle communication system of claim 8, wherein the predefined criteria includes an ordered list of data sources.

10. The vehicle communication system of claim 6, wherein each of the plurality of data sources includes a different vehicle control module.

11. The vehicle communication system of claim 6, wherein the processing unit processes the vehicle data to detect a drive event.

12. A method of obtaining vehicle data, the method comprising:
identifying, with a processing unit installed in a vehicle, one of a plurality of data sources providing vehicle data over a communication interface in the vehicle, wherein the plurality of data sources provide vehicle data from at least two different vehicle control modules;
incrementing, with the processing unit, a counter associated with the one of the plurality of data sources;
comparing, with the processing unit, the counter to a threshold;
when the counter exceeds the threshold, setting, with the processing unit, the one of the plurality of data sources as an active data source for receiving vehicle data; and
processing the vehicle data received provided by the one of the plurality of data sources.

13. The method of claim 12, further comprising:
identifying whether one of the plurality of data sources is set as the active data source;
when one of the plurality of data sources is set as the active data source,
identifying whether vehicle data is available on the active data source,
when vehicle data is available on the active data source, processing the vehicle data available on the active data source.

14. The method of claim 13, further comprising, when vehicle data is not available on the active data source, comparing a second counter associated with the active data source to a second threshold, and when the second counter exceeds the second threshold, setting none of the plurality of data sources as the active data source.

15. The method of claim 14, further comprising, when the second counter does not exceed the second threshold, incrementing the second counter.

16. The method of claim 13, further comprising identifying two or more of the plurality of data sources providing vehicle data, identifying one of the two or more of the plurality of data sources as a preferred data source based on predefined criteria, incrementing a counter associated with the preferred data source, comparing the counter to a threshold, setting the preferred data source as an active data source for receiving vehicle data when the counter exceeds the threshold, and processing the vehicle data provided by the preferred data source.

17. The method of claim 16, wherein identifying one of the two or more of the plurality of data sources as a preferred data source based on the predefined criteria includes accessing an ordered list of data sources.

18. The method of claim 12, wherein processing the vehicle data includes processing the vehicle data to detect a drive event.

* * * * *